US010208260B2

(12) United States Patent
Shih et al.

(10) Patent No.: US 10,208,260 B2
(45) Date of Patent: Feb. 19, 2019

(54) PRODUCTION OF LOW CLOUD POINT DISTILLATE FUELS

(71) Applicant: ExxonMobil Research and Engineering Company, Annandale, NJ (US)

(72) Inventors: Stuart S. Shih, Gainesville, VA (US); Timothy L. Hilbert, Middleburg, VA (US); Anastasios I. Skoulidas, Pittstown, NJ (US); Bryan A. Patel, Jersey City, NJ (US); Michael R. Chuba, Magnolia, TX (US); Sean C. Smyth, Spring, TX (US); Mohan Kalyanaraman, Media, PA (US)

(73) Assignee: EXXONMOBIL RESEARCH AND ENGINEERING COMPANY, Annandale, NJ (US)

(*) Notice: Subject to any disclaimer, the term of this patent is extended or adjusted under 35 U.S.C. 154(b) by 57 days.

(21) Appl. No.: 15/608,070

(22) Filed: May 30, 2017

(65) Prior Publication Data
US 2018/0002615 A1  Jan. 4, 2018

Related U.S. Application Data

(60) Provisional application No. 62/356,109, filed on Jun. 29, 2016.

(51) Int. Cl.
C10G 65/02 (2006.01)
C10G 45/02 (2006.01)
(Continued)

(52) U.S. Cl.
CPC .............. *C10G 65/02* (2013.01); *B01J 8/001* (2013.01); *B01J 8/008* (2013.01); *B01J 8/1872* (2013.01);
(Continued)

(58) Field of Classification Search
CPC .......... C10G 55/04; C10G 9/002; C10G 9/36; C10G 47/00; C10G 69/06
See application file for complete search history.

(56) References Cited

U.S. PATENT DOCUMENTS 5,110,444 A * 5/1992 Haun .................... C10G 65/08
208/143
5,869,011 A   2/1999 Lee
(Continued)

FOREIGN PATENT DOCUMENTS

CA   2827231 A1   8/2012
EP      954557 B1  12/2010
(Continued)

OTHER PUBLICATIONS

PCT/US2017/038077 International Search Report and Written Opinion dated Sep. 1, 2017.

Primary Examiner — Randy Boyer
Assistant Examiner — Juan C Valencia
(74) Attorney, Agent, or Firm — Priya G. Prasad

(57) ABSTRACT

Systems and methods are provided for catalytically dewaxing a diesel boiling range feed. In some aspects, catalytic dewaxing can be performed at low hydrogen treat gas rates and/or low hydrogen purity conditions. In other aspects, the systems and methods can allow for distillate dewaxing while reducing or minimizing the amount of equipment required.

8 Claims, 7 Drawing Sheets

(51) Int. Cl.

| | | |
|---|---|---|
| | *C10G 45/62* | (2006.01) |
| | *C10G 45/64* | (2006.01) |
| | *C10G 65/04* | (2006.01) |
| | *B01J 8/00* | (2006.01) |
| | *B01J 8/18* | (2006.01) |
| | *B01J 8/24* | (2006.01) |
| | *B01J 29/70* | (2006.01) |
| | *B01J 29/72* | (2006.01) |
| | *B01J 23/40* | (2006.01) |
| | *B01J 29/74* | (2006.01) |

(52) U.S. Cl.
CPC ............... *B01J 8/24* (2013.01); *C10G 45/02* (2013.01); *C10G 45/62* (2013.01); *C10G 45/64* (2013.01); *C10G 65/04* (2013.01); *B01J 23/40* (2013.01); *B01J 29/7261* (2013.01); *B01J 29/7292* (2013.01); *B01J 29/7461* (2013.01); *B01J 29/7492* (2013.01); *C10G 2300/10* (2013.01); *C10G 2300/1048* (2013.01); *C10G 2300/202* (2013.01); *C10G 2300/301* (2013.01); *C10G 2300/304* (2013.01); *C10G 2400/00* (2013.01)

(56) References Cited

U.S. PATENT DOCUMENTS

| | | | |
|---|---|---|---|
| 5,976,354 A | * | 11/1999 | Powers ................ C10G 65/043 208/212 |
| 8,377,286 B2 | | 2/2013 | Oliveri et al. |
| 2011/0015454 A1 | * | 1/2011 | Hanks .................... C10G 11/18 585/14 |
| 2012/0004479 A1 | * | 1/2012 | Hanks .................... C10G 3/50 585/256 |
| 2014/0291202 A1 | | 10/2014 | Xu et al. |

FOREIGN PATENT DOCUMENTS

| | | |
|---|---|---|
| WO | 1998029520 A1 | 7/1998 |
| WO | 2009088454 A1 | 7/2009 |

* cited by examiner

PRODUCTION OF LOW CLOUD POINT DISTILLATE FUELS

CROSS-REFERENCE TO RELATED APPLICATIONS

This application claims the benefit of U.S. Provisional Application No. 62/356,109, filed on Jun. 29, 2016, the entire contents of which are incorporated herein by reference.

FIELD

This invention provides methods for producing distillate fuels with improved cold flow properties while reducing hydrogen consumption.

BACKGROUND

In diesel hydroprocessing, it is sometimes beneficial to include a dewaxing stage as part of reaction train in order to improve properties of the resulting diesel fuel such as pour point or cloud point. Such improvements in cold flow properties can, for example, allow a diesel fuel to meet a desired specification for a diesel fuel pool, or the improvements can allow a diesel fuel to be suitable for a higher value use, such as use as a winter diesel fuel. While such improvements can be desirable, performing an additional dewaxing process on a diesel fuel product typically means that additional refinery resources are consumed in order to perform the process.

U.S. Pat. No. 8,377,286 describes hydroprocessing methods for diesel fuel production. The methods include options for processing diesel fuel under sour conditions, such as in the presence of 100 wppm or more of sulfur. The dewaxing catalysts used for dewaxing of the diesel fuel include catalysts with a relatively low surface area, such as catalysts with a ratio of zeolite surface area to external surface area of at least about 80:100. The dewaxing catalysts are described as having a hydrogenation metals content of at least 0.1 wt %.

U.S. Patent Application Publication No. 2011/0015454 describes methods for hydrodeoxygenating a renewable feed using hydrogen from an alternative hydrogen source, such as an off-gas from a fluid catalytic cracking (FCC) reactor. The low hydrogen content of the FCC off-gas stream is described as still being sufficient to enable deoxygenation and/or olefin saturation.

SUMMARY

In an aspect, a method for producing distillate fuel boiling range materials is provided. The method can include exposing a distillate fuel boiling range feedstock, optionally having a sulfur content of about 15 wppm or less, to a dewaxing catalyst. under dewaxing conditions to produce a distillate fuel boiling range product and/or blendstock having a cloud point that is reduced relative to a cloud point of the distillate fuel boiling range feedstock by at least about 5° C. (or at least 10° C., or at least 15° C., or at least 20° C.). The dewaxing catalyst can comprise a molecular sieve and a metal hydrogenation component. The dewaxing conditions can include one or more of a total pressure of about 200 psig or less (or about 150 psig or less), a hydrogen partial pressure of about 100 psig or less (about 15 psig to about 100 psig, or about 15 psig to about 50 psig), and a treat gas rate of 100 SCF/bbl-5000 SCF/bbl of a treat gas comprising about 5 vol % to about 50 vol % $H_2$ (or about 10 vol % to about 40 vol %). Optionally, the treat gas can have a sulfur content of about 0.001 vol % or less.

In another aspect, a system for producing distillate fuel boiling range materials is provided. The system can include a hydrotreating reactor having a hydrotreating inlet and a hydrotreating outlet, the hydrotreating inlet being in direct fluid communication with a first flow path of a first heat exchanger and a hydrotreating outlet. A feed can be provided to the hydrotreating inlet via the first flow path of the first heat exchanger. The system can also include a dewaxing reactor having a dewaxing inlet and a dewaxing outlet. The dewaxing inlet can be in direct fluid communication with a second heat exchanger and in indirect fluid communication with the hydrotreating outlet via the second heat exchanger. The system can further include a feed heater having a heater inlet in direct fluid communication with the dewaxing outlet and a heater outlet in direct fluid communication with a second flow path of the second heat exchanger. The heater outlet can be in indirect fluid communication with a second flow path of the first heat exchanger via the second flow path of the second heat exchanger. The system can also include a separation stage in fluid communication with the second flow path of the second heat exchanger.

In still another aspect, a system for producing distillate fuel boiling range materials is provided. The system can include a hydrotreating reactor having a hydrotreating inlet and a hydrotreating outlet. The hydrotreating inlet can be in direct fluid communication with an inlet of a feed heater and/or the hydrotreating outlet can be in direct fluid communication with a first flow path of a first heat exchanger. The system can also include a first separation stage comprising a stripper having a stripper inlet and a first stripper outlet. The stripper inlet can be in fluid communication with the first flow path of the first heat exchanger. The first stripper outlet can be in direct fluid communication with a second flow path of the first heat exchanger. The system can further include a dewaxing reactor having a dewaxing inlet and a dewaxing outlet. The dewaxing inlet can be in direct fluid communication with the second flow path of the first heat exchanger. The system can also include a second separation stage in fluid communication with the dewaxing outlet. The first stripper outlet can be in indirect fluid communication with the dewaxing inlet without passing through an intervening feed heater.

DETAILED DESCRIPTION OF THE EMBODIMENTS

Overview

Figure 1:
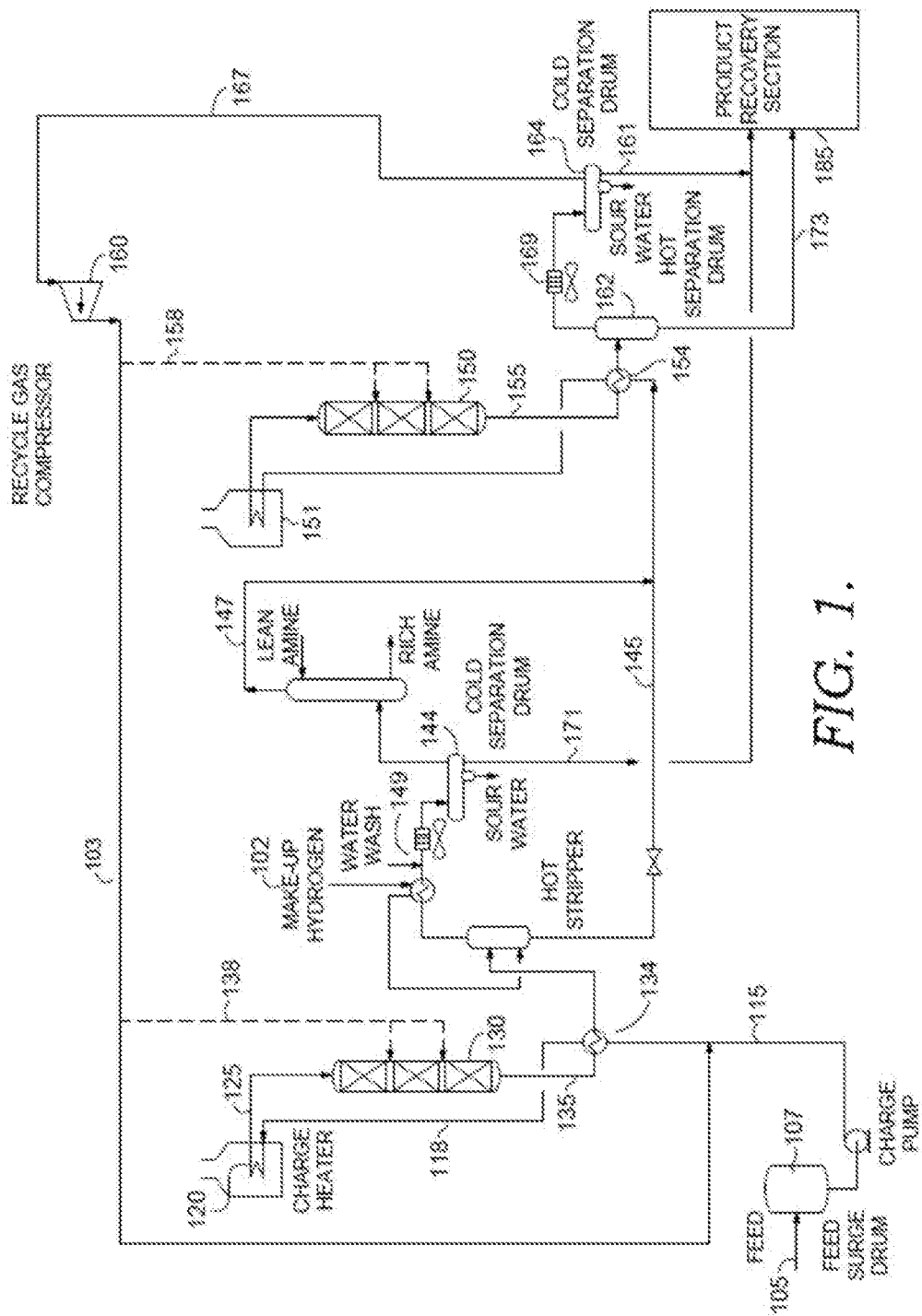
FIG. 1 shows an example of a configuration for sweet service dewaxing of a distillate boiling range feed.

In some aspects, methods are provided for catalytically dewaxing a diesel boiling range feed at relatively low hydrogen treat gas rates and/or relatively low hydrogen purity conditions. Catalytic dewaxing is conventionally viewed as an activity that can require elevated levels of hydrogen and/or hydrogen partial pressure in order to facilitate the reaction. It has been unexpectedly discovered performing catalytic dewaxing at relatively low hydrogen partial pressure, relatively low hydrogen purity, relatively low hydrogen treat gas rate, or a combination thereof can allow catalytic dewaxing to be performed using treat gas streams that would normally be viewed as unsuitable. Additionally, it has been discovered that performing catalytic dewaxing under relatively low hydrogen content conditions can allow for net production of hydrogen during dewaxing.

In some aspects, systems and methods are provided for reducing and/or minimizing the amount of equipment required for performing distillate dewaxing while also allowing both distillate hydrotreating and distillate dewaxing to be performed at desired temperatures. For sour service distillate dewaxing, the configuration for combined hydrotreating and dewaxing of a distillate feed can be improved by using a heater to directly heat the effluent from the distillate dewaxing. The temperatures of the feeds into hydrotreating and dewaxing can then be controlled using heat exchangers. For sweet service dewaxing, the configuration for combined hydrotreating and dewaxing of a distillate feed can be improved by using a single heater to provide heat for the combined configuration. The use of a hot stripper for performing a gas-liquid separation on the hydrotreated effluent can additionally or alternatively be beneficial for this type of configuration.

In some aspects, an improved collector design for a reactor can be provided. The collector can have an elliptical top surface where the direct flow path from the final catalyst bed to the reactor exit may be at least partially blocked at the top surface of the collector, which can allow for an improved (more uniform) velocity distribution within the bottom of the reactor for effluent near the exit. A more uniform velocity distribution can allow for more uniform catalyst performance in the final bed. For example, in a hydrotreating reactor, the more uniform velocity distribution can allow for improved desulfurization at a given temperature, as the flow rate of feed passing through the final catalyst bed can be more uniform across the width of the bed.

As used herein, unless otherwise specified, references to a liquid effluent or a liquid product are references to an effluent or product that is a liquid at about 25° C. and about 100 kPaa (~1 atm).

As used herein, fluid communication can refer to direct fluid communication or indirect fluid communication. Direct fluid communication refers to fluid communication between two processing structures without passing through an intervening processing structure, such as a feed heater, a heat exchanger, a reactor, or another processing structure for changing the temperature or composition of a feed. Indirect fluid communication refers to fluid communication between two structures based on passing through one or more other intervening processing structures.

As used herein, a feed heater corresponds to a processing structure for increasing the temperature of a fluid flow within a reaction system based on conversion of energy to heat within the heater. The increased temperature for the fluid flow can occur without exposing the fluid flow to a catalytic processing environment. A feed heater is defined to not include heat exchangers within the meaning of the term heater. Those of skill in the art should recognize that a heat exchanger involves transfer of energy between two materials without mixing of the materials. A first material (i.e., a first fluid flow) entering the heat exchanger along a first flow path can having an entry temperature higher than the exit temperature for the first material from the heat exchanger. A second material entering the heat exchanger along a second flow path can have an entry temperature lower than the exit temperature from the heat exchanger for the second material. Additionally, the temperature changes for the first material and second material can be substantially due to the exchange of heat between the first material and second material within the heat exchanger. By contrast, a typical feed heater can include some type of mechanism for conversion of energy to heat, such as combustion (e.g., to convert chemical energy to heat) or resistive heating (e.g., to convert electrical energy to heat). In a feed heater, a majority of the temperature change for a material between entry into the feed heater and exit from the heater can be due to heat provided by the conversion of energy to heat within the feed heater.

In various aspects, distillate fuel boiling range materials, such as a distillate fuel boiling range feedstock, distillate fuel boiling range product, or a distillate fuel boiling range blendstock, can have an initial boiling point of at least about 200° F. (93° C.), or at least about 250° F. (121° C.), or at least about 300° F. (149° C.), or at least about 350° F. (177° C.), or at least about 400° F. (204° C.), or at least about 450° F. (232° C.). The initial boiling point can vary widely, depending on how much kerosene or other lighter distillate components are included in the distillate fuel boiling range material. Additionally or alternatively, the feedstock can have a final boiling point of about 800° F. (427° C.) or less, or about 750° F. (399° C.) or less, or about 700° F. (371° C.) or less, or about 650° F. (343° C.) or less. Another way of characterizing a distillate fuel boiling range material is based on the boiling point required to boil a specified percentage of the feed. For example, the temperature required to boil at least 5 wt % of a feed is referred to as a "T5" boiling point. When characterizing a distillate fuel boiling range material based on a T5 boiling point, the distillate fuel boiling range material can additionally or alternatively have a T5 boiling point at least about 200° F. (93° C.), or at least about 250° F. (121° C.), or at least about 300° F. (149° C.), or at least about 350° F. (177° C.), or at least about 400° F. (204° C.), or at least about 450° F. (232° C.). Further additionally or alternatively, the distillate fuel boiling range material can correspond to a material that has a T5 boiling point of at least about 350° F. (177° C.), such as at least about 370° F. (188° C.), or at least about 400° F. (204° C.), or at least about 450° F. (232° C.). Still further additionally or alternatively, the distillate fuel boiling range material can have a T95 boiling point of about 800° F. (427° C.) or less, or about 750° F. (399° C.) or less, or about 700° F. (371° C.) or less, or about 650° F. (343° C.) or less. For example, a distillate fuel boiling range material can be characterized based on a T5 to T95 boiling range of about 200° F. (93° C.) to about 800° F. (427° C.), or about 300° F. (149° C.) to about 750° F. (399° C.), or about 350° F. (177° C.) to about 750° F. (399° C.), or about 350° F. (177° C.) to about 700° F. (371° C.). The boiling point for a distillate fuel boiling range material at a given weight percentage can be determined by any convenient method, such as the method specified in D2887.

Feedstocks

In some aspects, the feedstock can generally comprise a mineral oil. By "mineral oil" is meant a fossil/mineral fuel source, such as crude oil, and not the commercial organic product, such as sold under the CAS number 8020-83-5, e.g., by Aldrich. Examples of mineral oils can include, but are not limited to, straight run (atmospheric) gas oils, demetallized oils, coker distillates, cat cracker distillates, heavy naphthas, diesel boiling range distillate fraction, jet fuel boiling range distillate fraction, and/or kerosene boiling range distillate fractions. The mineral oil portion of the feedstock can comprise any one of these example streams or any combination thereof. In particular embodiments, the feedstock does not contain any appreciable asphaltenes.

Mineral feedstreams suitable for use in various embodiments can have a nitrogen content from about 10 wppm to about 6000 wppm nitrogen (within that range, such as at least about 50 wppm, at least about 100 wppm, or at least about 250 wppm, and/or such as about 2000 wppm or less or about 1000 wppm or less). For example, the nitrogen content can be about 250 wppm to about 6000 wppm, about 10 wppm to about 2000 wppm, about 250 wppm to about 2000 wppm, or about 10 wppm to about 1000 wppm. In some embodiments, feedstreams suitable for use herein can have a sulfur content from about 10 wppm to about 40000 wppm, such as about 100 wppm to about 30000 wppm or about 250 wppm to about 25000 wppm. Depending on the aspect, a feed for sweet service dewaxing can be hydrotreated prior to dewaxing to reduce the content of sulfur and/or nitrogen to which a dewaxing catalyst is exposed. In such embodiments, performing a separation between hydrotreating and dewaxing stages may be desirable. In such aspects involving sweet service dewaxing after prior hydrotreating, the sulfur content of a distillate fuel boiling range feedstock (product of hydrotreating but feed to dewaxing) can be about 100 wppm or less, e.g., about 50 wppm or less, about 30 wppm or less, about 20 wppm or less, about 15 wppm or less, or about 10 wppm or less, with any convenient amount close to zero as a lower bound (such as 0 wppm or 1 wppm). For example, when measurable, the sulfur content can optionally be from about 1 wppm to about 100 wppm, about 1 wppm to about 50 wppm, or about 1 wppm to about 10 wppm. In such aspects, the nitrogen content of the distillate fuel boiling range feedstock (again, product of hydrotreating but feed to dewaxing) can additionally or alternatively be about 50 wppm or less, e.g., about 25 wppm or less or about 10 wppm or less, with any convenient amount close to zero as a lower bound (such as 0 wppm or 1 wppm). For example, when measurable, the nitrogen content can optionally be from about 1 wppm to about 50 wppm, about 1 wppm to about 25 wppm, or about 1 wppm to about 10 wppm.

In various aspects of the invention, the feed can also include portions from biocomponent sources. The feed can include varying amounts of feedstreams based on biocomponent sources, such as vegetable oils, animal fats, fish oils, algae oils, etc. For a biocomponent feed that has been previously hydroprocessed or that is otherwise compatible with conventional refinery equipment, the feed could potentially be entirely derived from a biocomponent source. More typically, the feed can include at least about 0.1 wt % of feed based on a biocomponent source, e.g., at least about 0.5 wt %, at least about 1 wt %, at least about 3 wt %, at least about 10 wt %, or at least about 15 wt %. In such embodiments, the feed can include about 90 wt % or less of a feed based on a biocomponent source, e.g., about 60 wt % or less, about 40 wt % or less, or about 20 wt % or less. For example, the feed can include about 0.1 wt % to about 90 wt % based on a biocomponent source, about 0.5 wt % to about 20 wt %, or about 10 wt % to about 60 wt %.

As used herein, a biocomponent feed or feedstock refers to a hydrocarbon feedstock derived from a biological raw material component, such as vegetable fats/oils or animal fats/oils, fish oils, pyrolysis oils, and algae lipids/oils, as well as components of such materials, and in some embodiments can specifically include one or more types of lipid compounds. A biocomponent portion of a feed can be a portion that has been previously hydroprocessed, a portion that has not been previously hydroprocessed, or a combination thereof.

Catalyst for Distillate Fuel Dewaxing

In some aspects, dewaxing catalysts can be selected from molecular sieves such as crystalline aluminosilicates/borosilicates (zeolites), aluminophosphates (AlPOs) and/or silicoaluminophosphates (SAPOs). As used herein, molecular sieves are defined to include crystalline materials having a recognized zeolite framework structure, including crystalline materials having a framework structure recognized by the International Zeolite Association. The framework atoms in the molecular sieve framework structure can correspond to a zeolite (aluminosilicate/borosilicate) structure, an aluminophosphate structure, a silicoaluminophosphate structure, a metalloaluminphosphate structure, or any other conventionally know combination of framework atoms that can form a corresponding zeolitic framework structure. Thus, under this definition, crystalline materials having framework types corresponding to larger ring channels, such as 12-member ring channels, are included within the definition of a molecular sieve.

In most embodiments, the molecular sieve can comprise or be a 1-D or 3-D molecular sieve, e.g., a 1-D molecular sieve containing a 10-member ring pore channel. Non-limiting examples of molecular sieves can include ZSM-48, ZSM-23, ZSM-35, and combinations thereof (such as ZSM-48 and/or ZSM-23). Other suitable molecular sieves can include, but need not be limited to, SSZ-32, EU-2, EU-11, and/or ZBM-30.

In some embodiments, a dewaxing catalyst can generally correspond to any of a variety of dewaxing catalysts that conventionally have been used for distillate dewaxing. This can include any of various dewaxing catalysts based on a molecular sieve, usually having pore channel defined by at least a 10-member ring, an 11-member ring, and/or a 12-member ring.

Optionally, the dewaxing catalyst can include a binder for the molecular sieve, such as alumina, titania, silica, silica-alumina, zirconia, or a combination thereof. In certain embodiments, the binder can comprise or be alumina and/or titania, such as including at least alumina. In other embodiments, e.g., where hydrothermal stability is an issue, the binder can comprise or be titania, silica, and/or zirconia. Optionally, the binder can correspond to a binder with a relatively high surface area. One way to characterize the surface of the binder is in relation to the surface area of the molecular sieve in the dewaxing catalyst. For example, the ratio of molecular sieve surface area to binder surface (each as measured in $m^2/g$) can be about 80:100 or less, such as about 70:100 or less or about 60:100 or less.

One feature of molecular sieves that can impact the activity of the molecular sieve is the molar ratio of silicon to aluminum in the molecular sieve—herein, the ratio is typically given based on the oxide forms, namely resulting in a silica to alumina ($Si/Al_2$) molar ratio. In an embodiment where the molecular sieve is ZSM-48, for example, the silica to alumina ratio can be about 110:1 or less, such as about 100:1 or less, about 95:1 or less, about 90:1 or less, or about 80:1 or less, optionally also at least 40:1, at least 50:1, or at least 60:1. For example, the molar ratio of silica to alumina for ZSM-48 can be from about 40:1 to about 110:1, about 40:1 to about 100:1, about 50:1 to about 95:1, or about 60:1 to about 95:1.

The dewaxing catalyst can typically also include a metal hydrogenation component, such as a Group VIII metal (Groups 8-10 of IUPAC periodic table). Suitable Group VIII metals can include Pt, Pd, and/or Ni. Preferable Group VIII metals can be noble metals, such as Pt and/or Pd. The dewaxing catalyst can include at least about 0.1 wt % of a Group VIII metal, such as at least about 0.5 wt % or at least about 1.0 wt %. Additionally or alternatively, the dewaxing catalyst can include about 10 wt % or less of a Group VIII metal, such as about 5.0 wt % or less or about 3.5 wt % or less. For example, the dewaxing catalyst can include from 0.1 wt % to 10 wt % of the Group VIII metal(s), about 0.1 wt % to about 5.0 wt %, or about 0.5 wt % to about 3.5 wt %.

Catalytic dewaxing can be performed by exposing a feedstock to a dewaxing catalyst under effective (catalytic) dewaxing conditions. Effective dewaxing conditions can include a temperature of at least about 500° F. (260° C.), e.g., at least about 550° F. (288° C.), at least about 600° F. (316° C.), or at least about 650° F. (343° C.). Additionally or alternatively, the temperature can be about 750° F. (399° C.) or less, e.g., about 700° F. (371° C.) or less or about 650° F. (343° C.) or less. The pressure can be at least about 200 psig (~1.4 MPag), e.g., at least about 500 psig (~3.5 MPag), at least about 750 psig (~5.2 MPag), or at least about 1000 psig (~6.9 MPag). Additionally or alternatively, the pressure can be about 2000 psig (~14 MPag) or less, e.g., about 1500 psig (~10 MPag) or less, about 1200 psig (~8.3 MPag) or less, about 1000 psig (~6.9 MPag) or less, or about 800 psig (~5.5 MPag) or less. For example, the pressure can be about 1.4 MPag to about 14 MPag, about 1.4 MPag to about 6.9 MPag, or about 3.5 MPag to about 10 MPag. The Liquid Hourly Space Velocity (LHSV) can be at least about 0.5 $hr^{-1}$, e.g., at least about 1.0 $hr^{-1}$ or at least about 1.5 $hr^{-1}$. Additionally or alternatively, the LHSV can be about 5.0 $hr^{-1}$ or less, e.g., about 3.0 $hr^{-1}$ or less or about 2.0 $hr^{-1}$ or less. The (hydrogen-containing) treat gas rate can be at least about 500 SCF/bbl (~85 $Nm^3/m^3$), e.g., at least about 750 SCF/bbl (~130 $Nm^3/m^3$) or at least about 1000 SCF/bbl (~170 $Nm^3/m^3$). Additionally or alternatively, the (hydrogen-containing) treat gas rate can be about 10000 SCF/bbl (~1700 $Nm^3/m^3$) or less, e.g., about 5000 SCF/bbl (~850 $Nm^3/m^3$) or less, about 2000 SCF/bbl (~350 $Nm^3/m^3$) or less, or about 1250 SCF/bbl (~210 $Nm^3/m^3$) or less. For example, the treat gas rate can be about 500 SCF/bbl (~85 $Nm^3/m^3$) to about 10000 SCF/bbl (~1700 $Nm^3/m^3$), or about 500 SCF/bbl (~85 $Nm^3/m^3$) to about 5000 SCF/bbl (~850 $Nm^3/m^3$).

In some embodiments, the concentration of $H_2$ in the treat gas can be at least about 70 vol % relative to the total treat gas volume, and up to about 100 vol % (i.e., treat gas can be substantially composed of only $H_2$). In such embodiments, the treat gas can contain about 70 vol % to about 100 vol % of $H_2$, such as about 80 vol % to about 100 vol % or about 90 vol % to about 100 vol %.

Based on dewaxing under effective catalytic dewaxing conditions, the cloud point of a dewaxed distillate fuel fraction can be reduced relative to the feedstock by at least about 10° F. (~6° C.), such as at least about 20° F. (~11° C.) or at least about 30° F. (~17° C.). Additionally or alternatively, where the feedstock is hydrotreated prior to dewaxing, the cloud point of a dewaxed distillate fuel fraction can be reduced relative to the hydrotreated effluent by at least about 10° F. (~6° C.), such as at least about 20° F. (~11° C.) or at least about 30° F. (~17° C.). The amount of cloud point reduction can depend on a variety of factors, including the sulfur content of the feedstock, the nitrogen content of the feedstock, and the selected effective dewaxing conditions.

Process Variation—Low $H_2$ Content Treat Gas

Conventional catalytic dewaxing processes typically use an excess of hydrogen-containing treat gas (at least about 80 vol % $H_2$) at a total pressure of at least about 250 psig (~1.7 MPa). It has been discovered that, under sweet processing conditions, catalytic dewaxing can advantageously be performed under relatively low total pressure (e.g., less than about 1.4 MPag) and relatively low $H_2$ partial pressure (e.g., less than about 700 kPag) conditions.

The dewaxing conditions for a "sweet" dewaxing process can include use of a treat gas with a relatively low concentration of $H_2$. Sweet dewaxing conditions can correspond to performing dewaxing in an environment including the equivalent of 100 wppm of sulfur or less, e.g., 10 wppm of sulfur or less, down to an arbitrarily low amount of sulfur such as about 0 wppm or about 1 wppm. It is noted that gas phase $H_2S$ can prevent the dewaxing environment from being a sweet environment. Thus, for example, a feed containing greater than about 100 wppm organic sulfur that is hydrotreated, but then cascaded to dewaxing so that $H_2S$ is not removed, can also correspond to non-sweet dewaxing conditions. The nitrogen in the environment for "sweet" dewaxing can additionally or alternatively be low. Sweet dewaxing conditions can correspond to performing dewaxing in an environment including the equivalent of 25 wppm of nitrogen or less, e.g., 5 wppm of sulfur or less, down to an arbitrarily low amount of nitrogen such as about 0 wppm or about 1 wppm.

In aspects where sweet dewaxing is performed with a relatively low $H_2$ concentration treat gas, the concentration of $H_2$ in the treat gas can be about 5 vol % to about 60 vol % relative to the volume of treat gas, e.g., at least about 5 vol %, at least about 8 vol %, at least about 10 vol %, at least about 15 vol %, or at least about 20 vol %, and/or about 60 vol % or less, about 50 vol % or less, about 40 vol % or less, about 30 vol % or less, or about 25 vol % or less. For example, in relatively low hydrogen embodiments, the concentration of $H_2$ in the treat gas can be about 5 vol % to about 50 vol %, about 10 vol % to about 40 vol %, or about 10 vol % to about 30 vol %. Additionally or alternatively, the sulfur content of the relatively low $H_2$ concentration treat gas can be about 0.001 vol % or less.

In aspects where sweet dewaxing is performed with a low $H_2$ concentration treat gas, the total treat gas rate can correspond to any of the amounts described above. This can correspond to a substantially lower rate of $H_2$ gas, due to the lower concentration of $H_2$ in the treat gas. For example, the $H_2$ treat gas rate (i.e., a portion of the total treat gas rate, where hydrogen is less than 100% of the total treat gas) can be about 25 SCF/bbl (~4 $Nm^3/m^3$) to about 5000 SCF/bbl (~850 $Nm^3/m^3$), for example about 50 SCF/bbl (~7 $Nm^3/m^3$) to about 1000 SCF/bbl (~170 $Nm^3/m^3$) or about 50 SCF/bbl (~7 $Nm^3/m^3$) to about 500 SCF/bbl (~85 $Nm^3/m^3$).

In aspects where sweet dewaxing is performed with a low $H_2$ concentration treat gas, the partial pressure of $H_2$ in the dewaxing environment may be low, such as about 100 psig (~700 kPag) or less, e.g., about 50 psig (~350 kPag or less). For example, the $H_2$ partial pressure can be about 70 kPag to about 700 kPag, or about 70 kPag to about 350 kPag, or about 100 kPag to about 350 kPag.

The ability to perform catalytic dewaxing under low $H_2$ partial pressure conditions can allow the $H_2$-containing treat gas to be derived from a non-conventional source. For example, within a refinery and/or chemicals production setting, a variety of processes can generate a gas phase product having a total pressure of less than about 500 psig (~3.5 MPag), such as less than about 200 psig (~1.4 MPag), that has a $H_2$ concentration of about 5 vol % to about 50 vol % (or optionally from about 5 vol % to about 60 vol %) after removal of $H_2S$ and $NH_3$ from the gas phase product. Table 1 provides an exemplary list of processes that can generate such a gas phase product.

TABLE 1

Low-Pressure, Low-Purity Hydrogen Streams

| | $H_2$ purity range (vol %) | |
|---|---|---|
| | Low | High |
| From Refinery | | |
| FCC De-Ethanizer | 8 | 10 |
| Refinery Fuel Gas | 10 | 35 |
| FCC Off Gas | 15 | 30 |
| Kerosene Hydrotreater | 50 | 65 |
| General Hydrotreater Off Gas | 25 | 50 |
| (Low Pressure) Hydrocracking Off Gas | 35 | 55 |
| From Chemicals Plant | | |
| Ethylene Production | 30 | 95 |
| Methanol Synthesis | 60 | 80 |
| Ammonia (Note: Typically >500 psig) | 50 | 90 |
| Partial Oxidation | 50 | 90 |

Hydrotreatment and/or Hydrofinishing

Optionally, the feedstock can be treated in one or more hydrotreatment stages prior to dewaxing. The reaction conditions in a hydrotreatment stage can be conditions suitable for reducing the sulfur content of the feedstock. The reaction conditions can include an LHSV of 0.3 to 5.0 $hr^{-1}$, a total pressure from about 200 psig (1.4 MPag) to about 3000 psig (~21 MPag), a treat gas containing at least about 80% hydrogen (remainder inert gas), and a temperature from about 500° F. (~260° C.) to about 800° F. (~427° C.). In some preferred embodiments, the reaction conditions include an LHSV from about 0.5 to about 1.5 $hr^{-1}$, a total pressure from about 700 psig (~4.9 MPag) to about 2000 psig (~14 MPag), and a temperature from about 600° F. (~316° C.) to about 700° F. (~399° C.). The treat gas rate can be from about 500 SCF/bbl (~85 $Nm^3/m^3$) to about 10000 SCF/bbl (~1700 $Nm^3/m^3$) of hydrogen, depending on various factors including the nature of the feed being hydrotreated. Note that the above treat gas rates refer to the rate of hydrogen flow. If hydrogen is delivered as part of a gas stream having less than 100% hydrogen, the treat gas rate for the overall gas stream can be proportionally higher.

In some aspects of the invention, the hydrotreatment stage(s) can reduce the sulfur content of the feed to a suitable level. For example, the sulfur content can be reduced sufficiently so that the feed into the dewaxing stage can have about 500 wppm sulfur or less, for example about 250 wppm or less, about 100 wppm or less, or about 50 wppm or less. Additionally or alternately, the sulfur content of the feed to the dewaxing stage can be at least about 1 wppm sulfur, for example at least about 5 wppm or at least about 10 wppm.

Additionally or alternately, the sulfur content of the hydrotreated effluent can correspond to any of the other sulfur values noted above.

The catalyst in a hydrotreatment stage can be a conventional hydrotreating catalyst, such as a catalyst composed of a Group VIB metal (Group 6 of IUPAC periodic table) and/or a Group VIII metal (Groups 8-10 of IUPAC periodic table) on a support. Suitable metals can include cobalt, nickel, molybdenum, tungsten, or combinations thereof. In some embodiments, preferred combinations of metals can include, but need not be limited to, Ni/Mo and Ni/Co/Mo. Suitable supports can include silica, silica-alumina, alumina, titania, or the like, or combinations thereof.

After hydrotreatment, the hydrotreated effluent can optionally but preferably be separated, such as by separating the gas phase effluent from a liquid phase effluent, in order to remove gas phase contaminants generated during hydrotreatment. Alternatively, in some aspects the entire hydrotreated effluent can be cascaded into the catalytic dewaxing stage(s) without separation.

Optionally, a hydrofinishing stage can also be included after the catalytic dewaxing stage(s), such as in the final catalytic dewaxing reactor or in a separate reactor. Hydrofinishing catalysts can include catalysts containing Group VI metals and/or Group VIII metals. In some embodiments, preferred metals can include at least one metal sulfide having a strong hydrogenation function. In certain embodiments, the hydrofinishing catalyst can include a Group VIII noble metal, such as Pt and/or Pd. The mixture of metals may also be present as bulk metal catalysts wherein the amount of metal is about 30 wt % or greater based on catalyst. Suitable metal oxide supports can include low acidic oxides such as silica, alumina, silica-aluminas, titania, or combinations thereof, for example including alumina. One preferred hydrofinishing catalysts for aromatic saturation can comprise at least one metal having relatively strong hydrogenation function on a porous support. Typical support materials can include amorphous or crystalline oxide materials such as alumina, silica, and silica-aluminas. The support materials may optionally be modified, such as by halogenation or, in particular, fluorination. The metal content of the catalyst can often be as high as about 20 weight percent for non-noble metals. In some embodiments, preferred hydrofinishing catalysts can include a crystalline material belonging to the M41S class or family of catalysts. The M41S family of catalysts are mesoporous materials having high silica content. Examples can include, but need not be limited to, MCM-41, MCM-48, MCM-50, and combinations thereof. A preferred member of this class is MCM-41.

Hydrofinishing conditions can include temperatures from about 125° C. to about 425° C., for example from about 180° C. to about 280° C., a total pressure from about 200 psig (~1.4 MPag) to about 800 psig (~5.6 MPag), for example from about 400 psig (~2.8 MPag) to about 700 psig (~4.9 MPag), and a liquid hourly space velocity from about 0.1 $hr^{-1}$ to about 5 $hr^{-1}$ LHSV, for example from about 0.5 $hr^{-1}$ to about 1.5 $hr^{-1}$. The treat gas rate can be selected to be similar to a catalytic dewaxing stage, similar to a hydrotreatment stage, or any other convenient selection.

Distillate Processing Configuration—Sweet Dewaxing

In FIGS. 1 to 4, various heat exchangers can be used to transfer heat between streams or flows within a system configuration. The flows that exchange or transfer heat within a heat exchanger can pass through a heat exchanger along a first flow path or a second flow path. In this discussion, the use of "first flow path" and "second flow path" does not by itself imply a relative temperature for a stream following a particular flow path. However, the direction of heat transfer within a heat exchanger between a first flow path and second flow path can be readily apparent to those of skill in the art.

Figure 2:
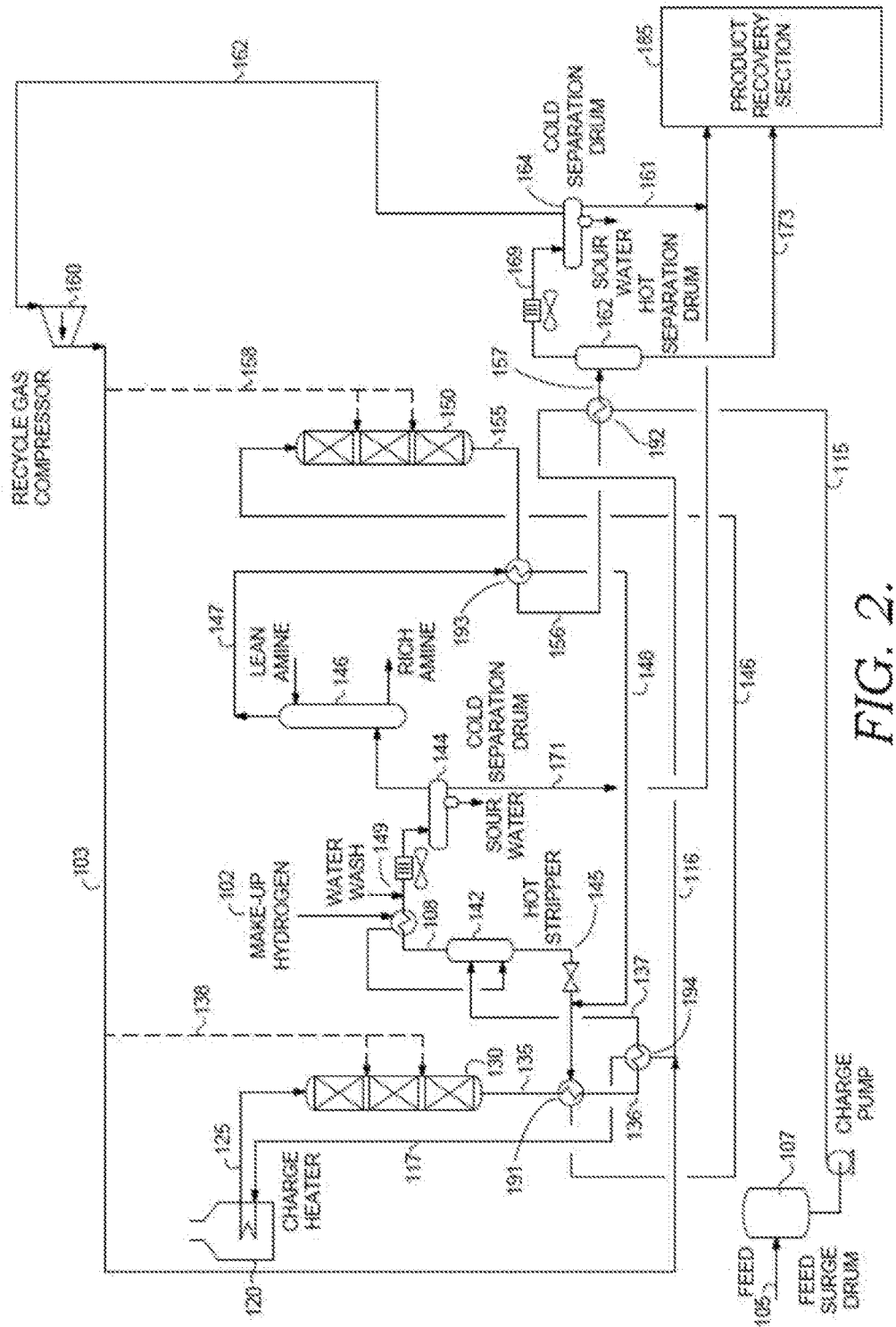
FIG. 2 shows another example of a configuration for sweet service dewaxing of a distillate boiling range feed.

FIGS. 1 and 2 show examples of a system configuration for performing hydrotreatment of a feed follow by dewaxing under sweet conditions. (Elements having the same number between FIGS. 1 and 2 correspond to elements having similar functionality.) FIG. 1 shows an example of a configuration where two feed heaters can be used in order to separately control the temperatures of the hydrotreating and dewaxing reactors. Because stripping can be performed between hydrotreatment and dewaxing when performing a sweet dewaxing process, the stripping bottoms (corresponding to the input stream for dewaxing) can be substantially cooled relative to the exit temperature of the hydrotreated effluent. Although sweet dewaxing can typically be performed at a lower temperature than hydrotreatment, the temperature of the stripper bottoms can still be below the desired temperature for dewaxing. In the type of configuration shown in FIG. 1, the second feed heater prior to dewaxing can be used to increase the temperature of the stripper bottoms to the desired dewaxing inlet temperature. FIG. 2 shows an example of a configuration where a single feed heater can be used to provide heat for the system. This can be enabled by performing heat exchange between the stripper bottoms effluent from and the hot effluent from the hydrotreatment reactor. It is noted that the stripper bottoms can be produced by a stripper that performs stripping without substantially reducing the pressure of the stripper bottoms. In other words, the difference in pressure between the stripper bottoms and the input to the stripper can be about 200 kPa or less, for example about 100 kPa or less. Maintaining a pressure during stripping can reduce or minimize the temperature drop that can occur during stripping. This can allow heat exchange to be used to heat the stripper bottoms back to the desired temperature for dewaxing, as opposed to requiring a separate heater as may be needed for a low pressure stripper bottoms fraction.

In FIG. 2, a total of four heat exchangers can be used to allow a single feed heater to provide the heat for the input flows to both a hydrotreatment reactor and a dewaxing reactor. A distillate boiling range feedstock 105 can be introduced into the reaction system, optionally via a feed surge drum 107. A charge pump after the feed surge drum can allow the resulting input feed 115 to have a desired pressure. The input feed 115 can then be passed into a heat exchanger 192 along a first flow path for exchange of heat with the higher temperature dewaxed effluent 156 (introduced via a second flow path) that has (optionally) already been cooled once via heat exchange in heat exchanger 193. The heat exchanged input flow 116 can then be combined with recycled hydrogen-containing stream 103. Alternatively, a recycled hydrogen-containing stream can be added at another location, such as any location prior to entering hydrotreating reactor 130 and/or recycled hydrogen can be separately introduced into hydrotreating reactor 130. Heat exchanged input flow 116 (optionally after combination with recycled hydrogen-containing stream 103) can be heat exchanged along a first flow path with previously cooled hydrotreated effluent 136 (along a second flow path) in heat exchanger 194. The twice heat exchanged input flow 117 can then be passed into charge heater 120 to increase the temperature of the heated input flow 125 to the desired temperature for hydrotreatment. The heated input flow 125 (or heated hydrotreatment input stream) can then be passed into hydrotreating reactor 130. Optionally, additional recycled hydrogen-containing gas 138 can be introduced into hydrotreating reactor 130.

Hydrotreatment of the feed in hydrotreating reactor 130 can result in production of a hydrotreating effluent 135. The hydrotreated effluent 135 can be cooled along a first flow path in heat exchanger 191 by heat exchange with hot stripper bottoms fraction 145 (along a second flow path). This can provide additional heat to the stripper bottoms (i.e., a portion of the hydrotreated effluent after stripping to remove light ends and contaminant gases such as $H_2S$ and/or $NH_3$) so that the subsequent dewaxing process can be performed at a desired temperature without requiring a separate charge heater prior to the dewaxing reactor 150. The cooled hydrotreated effluent 136 can then be heat exchanged a second time with the input flow 116 in heat exchanger 194. The twice cooled hydrotreating effluent 117 (or hydrotreated intermediate stream) can then be passed into hot stripper 142 for separation of the hydrotreated intermediate stream into one or more gas phase portions and one or more liquid phase portions (i.e., gas phase and liquid phase portions with respect to phases at about 20° C. and about 100 kPaa or 1 atm). In addition to the stripper bottoms, which can optionally correspond to a distillate boiling range portion, the stripper can also generate an overhead fraction 108 that can be further processed to eventually allow for recovery of a recycled hydrogen-containing stream 147. For example, the overhead fraction can first be cooled to separate out a liquid phase portion that can be returned to the stripper 142. Make-up hydrogen 102 can be introduced at a convenient location, such as prior to the water wash, to replace hydrogen consumed in the hydrotreatment reactor 130 and the dewaxing reactor 150. The remaining portion of the overhead can then be passed through a water wash, and then can be separated in a cold separator 144. Cold separator 144 can produce a sour water stream, a naphtha and/or light ends product stream 171 which can be sent to product recovery section 185, and a hydrogen-containing stream that can be sent to amine wash or scrubber 146. The resulting scrubbed hydrogen-containing stream 147, having a reduced content of $H_2S$, can optionally be heat exchanged with the dewaxing effluent 155 in heat exchanger 193. This can produce a heat exchanged hydrogen-containing stream 148 that can (optionally) be added to stripper bottoms 145 at a convenient location, including after heat exchanger 191 (corresponding to addition to heat exchanged bottoms 146).

The heat exchanged bottoms (optionally corresponding to a distillate boiling range portion) can then be passed into dewaxing reactor 150. By heat exchanging the stripper bottoms 145 with the hydrotreated effluent 135, the resulting heat exchanged bottoms 146 can be at a sufficient temperature to allow for dewaxing in dewaxing reactor 150 without the use of a separate charge heater. As a result, the outlet from stripper 142 (i.e., stripper bottoms 145) can be in indirect fluid communication with the inlet to dewaxing reactor 150 without passing through an intervening feed heater. Optionally, recycled hydrogen-containing stream 158 can be added to dewaxing reactor 150. Optionally, dewaxing reactor 150 can further include at least a portion of a hydrofinishing catalyst. The dewaxed effluent 155 can then optionally be heat exchanged with hydrogen-containing stream 147, and then the cooled dewaxed effluent 156 can be heat exchanged with input feed 115.

The twice cooled dewaxed effluent 157 (or dewaxed product stream) can then be separated in a manner similar to the separation of the hydrotreated effluent. For example, the dewaxed product stream 157 can be separated in a hot separation drum 162 to form a bottoms fraction 173 and an overhead fraction 169. The overhead fraction 169 can be water washed and then separated in a cold separation drum 164 to form a sour water stream, a naphtha and/or light ends product stream 161, and a hydrogen-containing stream 162. Since the dewaxing is performed under sweet conditions, the hydrogen-containing stream 162 can be compressed 160 and then used as a recycled hydrogen stream 103. The bottoms fraction 173 can be passed into a product recovery section 185 for recovery of one or more distillate fuel product fractions, such as kerosene, jet, and/or diesel boiling range product fractions.

The differences between FIG. 2 and FIG. 1 can demonstrate the advantages of the configuration in FIG. 2. In FIG. 1, heat exchange can be performed for both reactors between the reactor input and the reactor output. Thus, in FIG. 1 a heat exchange 134 can be performed between the input feed 115 for hydrotreatment and the hydrotreated effluent 125, and another heat exchange 154 can be performed between stripper bottoms 145 (i.e., input for dewaxing) and the dewaxed effluent 155. In this arrangement, additional heat can still be desirable to increase the temperature of the stripper bottoms to the desired temperature for dewaxing. As a result, the configuration in FIG. 1 can include a second dewaxing charge (feed) heater 151 to further heat stripper bottoms 145 prior to dewaxing. In FIG. 2, the dewaxed effluent can instead be heat exchanged with the optional hydrogen-containing stream 147 and/or with input feed 115. Because a sweet dewaxing process can be performed at a cooler temperature than a distillate hydrotreating process, the heat exchangers shown in FIG. 2 between the hydrotreated effluent and the stripper bottoms (dewaxing input) can be sufficient to achieve a desired dewaxing temperature.

Distillate Processing Configuration—Sour Dewaxing

Figure 3:
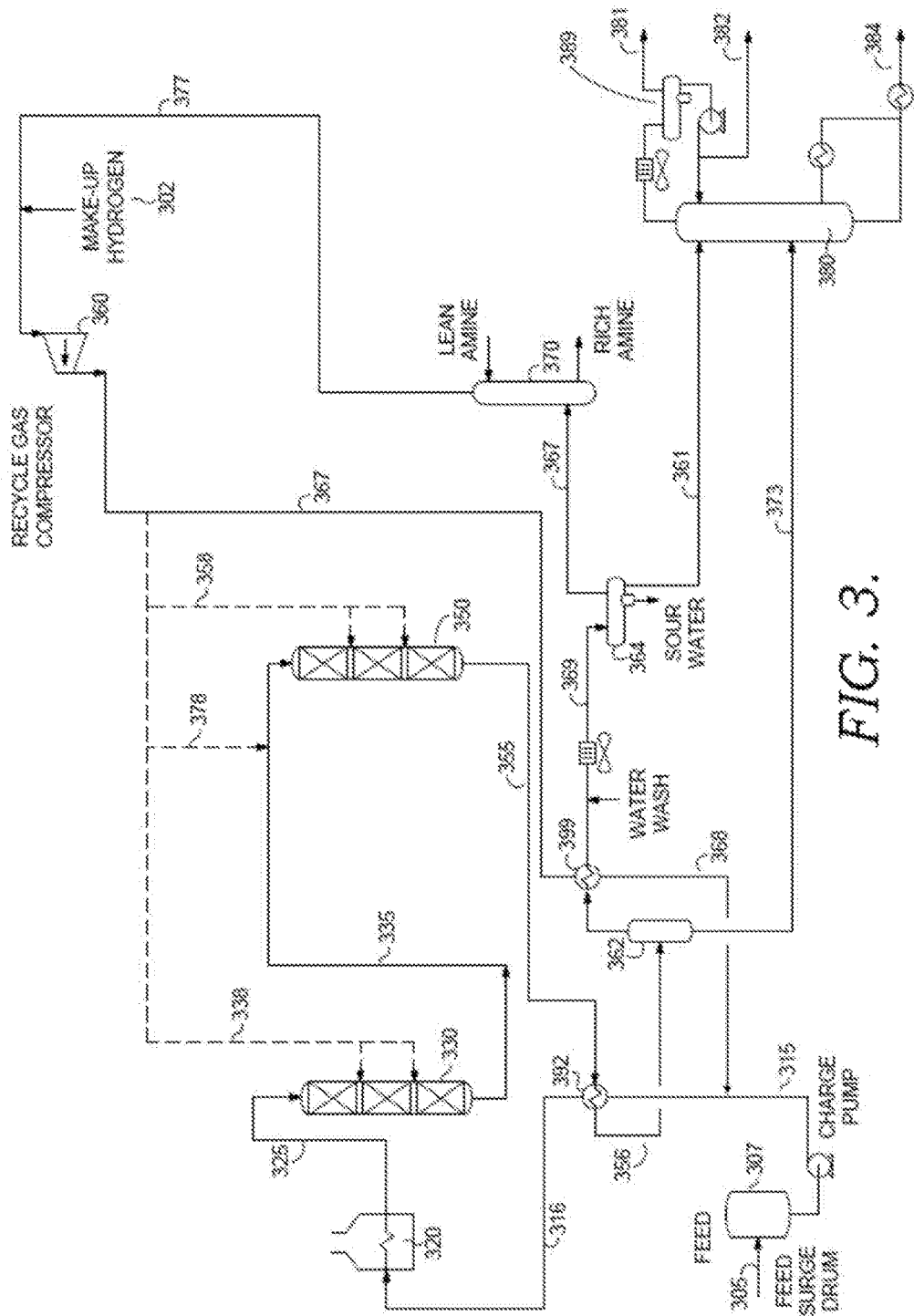
FIG. 3 shows an example of a configuration for sour service dewaxing of a distillate boiling range feed.
Figure 4:
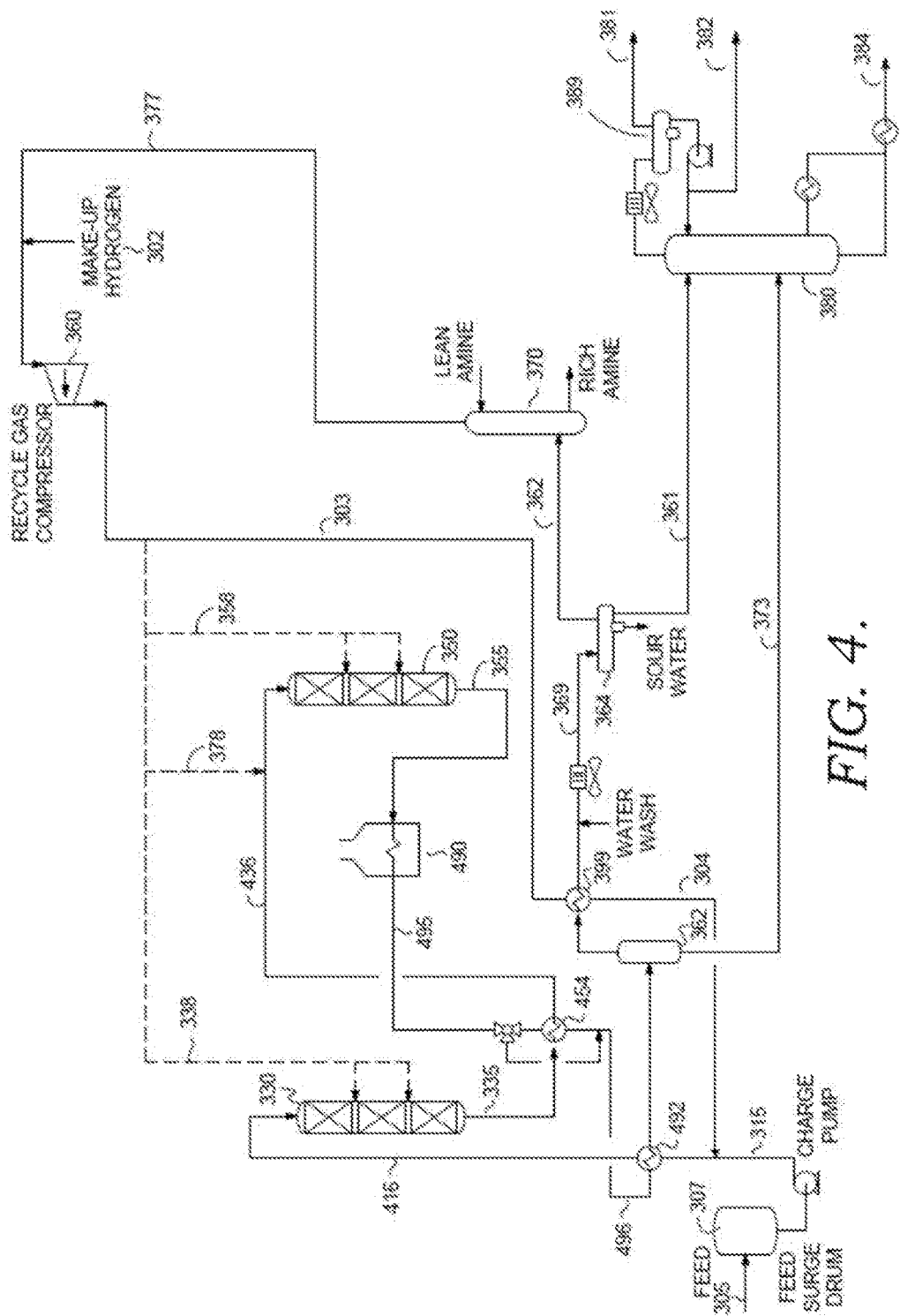
FIG. 4 shows another example of a configuration for sour service dewaxing of a distillate boiling range feed.

FIGS. 3 and 4 show examples of a system configuration for performing hydrotreatment of a feed follow by dewaxing under sour conditions. The sour conditions in the dewaxing reactor can be due at least in part to the presence of $H_2S$ and/or $NH_3$ in the input flow to the dewaxing reactor, even though the amount of organic sulfur and/or organic nitrogen in the feed may otherwise be reduced to a sufficiently low level for sweet processing. (Elements having the same number between FIGS. 3 and 4 correspond to elements having similar functionality.) FIG. 3 shows an example of a configuration where the feed heater for the configuration is located prior to the hydrotreatment reactor. In the type of configuration shown in FIG. 3, the temperature for both the hydrotreatment reactor and the dewaxing reactor can be set by the initial heater prior to hydrotreatment. As a result, the inlet temperature for hydrotreatment can be sufficiently high to accommodate the inlet temperature of the subsequent dewaxing step. However, the temperature for sour dewaxing can often be greater than the temperature required for hydrotreatment of the feed. As a result, providing heat for both hydrotreatment and dewaxing using a single initial heater can cause a higher inlet temperature to be used for hydrotreatment than would otherwise be necessary. This can lead to reduced catalyst lifetime in the hydrotreatment reactor. This can additionally or alternatively lead to increased hydrogen consumption due to excess treating of the feed during hydrotreatment, such as additional saturation of aromatic rings. FIG. 4 shows an example of a configuration where the feed heater can instead be used to heat the effluent from the dewaxing reactor. In FIG. 4, the feeds for both hydrotreatment and dewaxing can be heated to the respective desired temperatures by heat exchange with the heated dewaxed effluent. This can allow a single feed heater to be used for the configuration while still allowing for independent control of the inlet temperatures for both hydrotreatment and dewaxing.

In FIG. 4, a total of three heat exchangers can be used to allow a single feed heater to provide the heat for the input flows to both a hydrotreatment reactor and a dewaxing reactor. A distillate boiling range feedstock 305 can be introduced into the reaction system, optionally via a feed surge drum 307. A charge pump after the feed surge drum can allow the resulting input feed 315 to have a desired pressure. The input feed 315 can then be passed into a heat exchanger 492 along a first flow path for exchange of heat with the heated dewaxed effluent 496 (along a second flow path) that has already been cooled once via heat exchange in heat exchanger 454. The input feed 415 (and/or the heat exchanged input flow 416) can then be combined with recycled hydrogen-containing stream 304. Alternatively, a recycled hydrogen-containing stream can be added at another location, such as any location prior to entering hydrotreating reactor 330 and/or recycled hydrogen can be separately introduced into hydrotreating reactor 330. Heat exchanged input flow 416 can then be passed into hydrotreating reactor 330. Optionally, additional recycled hydrogen-containing gas 338 can be introduced into hydrotreating reactor 330.

Hydrotreatment of the feed in hydrotreating reactor 330 can result in production of a hydrotreating effluent 335. The hydrotreated effluent 335 can be heated along a first flow path in heat exchanger 454 by heat exchange with heated dewaxed effluent 495 (along a second flow path). This can increase the temperature of the resulting heat exchanged hydrotreated effluent 436 to a desired temperature for dewaxing. Optionally, recycled hydrogen-containing stream 378 can be added to the heat exchanged hydrotreated effluent 436.

The heat exchanged hydrotreated effluent 436 can then be passed into dewaxing reactor 350. Optionally, recycled hydrogen-containing stream 358 can be added to dewaxing reactor 150. Optionally, dewaxing reactor 150 can further include at least a portion of a hydrofinishing catalyst. The dewaxed effluent 355 can then be heated in heater 490 to produce heated dewaxed effluent 495. The heated dewaxed effluent 495 can then be heat exchanged twice. A first heat exchange 454 can adjust the temperature of hydrotreated effluent 335 to a desired dewaxing inlet temperature in heat exchanged hydrotreated effluent 436, while a second heat exchange 492 can heat input feed 415 to a desired hydrotreatment input temperature in heat exchanged input feed 416.

After heat exchange, the dewaxed effluent can be passed into a series of separators. For example, the dewaxed effluent can initially be passed into a hot separator 362, such as a flash drum, for separation of the dewaxed effluent into a (substantially) distillate boiling range portion 373 and a lower boiling portion 369. The lower boiling portion can then be processed to remove contaminants such as $NH_3$ and $H_2S$. For example, the lower boiling portion 369 can be passed through a water wash and then separated in a cold separator 364. This can result in formation of a sour water stream, an overhead stream 367, and a naphtha and/or light ends stream 361. The distillate boiling range portion 373 and the naphtha and/or light ends stream 361 can then be sent to a product separator, such as a flash separator 380 or another type of separator or fractionator, to form various product streams. For example, flash separator 380, in combination with additional gas-liquid separator 389, can form one or more off-gas streams 381, one or more naphtha boiling range streams 382, and/or one or more distillate boiling range streams 384. The overhead stream 367 can be passed through an amine wash or scrubber 370 to remove $H_2S$, resulting in hydrogen-containing stream 377. Hydrogen-containing stream 377 can be supplemented with make-up hydrogen 302, either prior to or after compression 360. The resulting compressed hydrogen-containing stream 303 can be heat exchanged 399 prior to use as recycle stream 304.

The differences between FIG. 4 and FIG. 3 can demonstrate the advantages of the configuration shown in FIG. 4. In FIG. 3, heat exchanged input feed 316 can be further heated in feed heater 320 to produce a heated hydrotreatment input feed 325. The heated hydrotreatment input feed 325 can be at a sufficient temperature to enable both the reaction in hydrotreatment reactor 330 and the reaction in dewaxing reactor 350. This can also mean that dewaxed effluent 355 may only be heat exchanged to form cooled dewaxed effluent 356 prior to being passed into the various separators for product formation.

Processing Configuration—Collector Design

In some aspects, processing in a fixed bed reactor can be improved using an outlet collector with a top face at least partially blocked with regard to fluid flow. The top face or surface of the collector can be partially blocked or completely blocked. For an at least partially blocked top surface of a collector, the available surface area for fluid flow can be reduced by about 50% to about 100%, for example about 60% to about 100%, about 70% to about 100%, about 80% to about 100%, or about 90% to about 100%. For a top surface at least partially blocked but allowing some fluid flow, the available surface area for fluid flow can be reduced by about 50% to about 95%, for example about 70% to about 95% or about 80% to about 95%. For a collector with a top face at least partially blocked, the blocked portion of the surface area can include the geometric center of the top surface, and can further include at least a circular portion of surface area with a center corresponding to the geometric center, where the circular portion of the surface area corresponds to at least about 25% of the surface area of the top surface of the collector.

Examples of suitable collector designs can include collectors having a round cylindrical shape or an elliptical shape. For an elliptical collector, the ratio of the radii for the ellipse can be between about 1.5 and about 1.9.

Using a collector with an at least partially blocked top face can reduce or minimize flow variations within a fixed bed reactor. In some aspects, such a collector can have added benefit for fixed bed reactors with a final catalyst bed that can be relatively short, such as a final catalyst bed with a catalyst bed depth of about 3 meters or less, for example about 2 meters or less. In some aspects, such a collector can have added benefit for a reactor having an elliptical bottom head, as opposed to a reactor with a semi-spherical bottom head. The fixed bed reactor can correspond to a continuous liquid phase reactor or a continuous gas phase reactor, which can include a trickle bed reactor where the gas phase can be continuous, but various discrete liquid phases may also be formed within at least one fixed catalyst bed.

An example of a suitable application for a collector with an at least partially blocked top surface can be production of low sulfur gasoline and/or distillate fuels. Suitable naphtha and/or distillate boiling range feeds can have sulfur contents of up to about 1.0 wt % or more. During hydrodesulfurization of naphtha and distillate boiling range feeds, it can be desirable to expose the feed to desulfurization conditions that have sufficient severity to reduce the sulfur content to about 15 wppm or less, for example about 10 wppm or less. However, in addition to increasing sulfur removal, increasing the severity of reaction conditions during hydrodesulfurization can lead to increased olefin saturation, increased aromatic saturation, increased conversion of feed to lower boiling (and typically less valuable) products, and/or reduced catalyst lifetime. As a result, it can be desirable to have relatively uniform reaction conditions throughout the catalyst beds in a hydrodesulfurization reactor, as this can reduce or minimize the severity needed to still achieve a desired sulfur target.

It has been discovered that a collector with an open top face can lead to unexpected non-uniformity in the flow pattern within the final catalyst bed(s) in a reactor with an elliptical or semi-spherical bottom head. For example, the flow within the final catalyst bed can develop an increased velocity in the portion of the catalyst bed that is directly above the collector, while the sides of the catalyst bed can have a lower velocity. This can lead to variations in the amount of residence time for a feed within the final catalyst bed (or beds) depending on the location within the reactor (i.e., channeling of feed), and therefore variations in severity of processing. This unexpected non-uniformity can be reduced or minimized by at least partially blocking the top elliptical face of the collector. This can force the central portion of the flow within the reactor to have to radially disperse in order to exit the through the collector. This can reduce or minimize the channeling that occurs near the bottom of the reactor.

To demonstrate the benefits of a collector with an at least partially blocked top surface, a computational fluid dynamics (CFD) model was used to assess the impact of outlet collector design on flow velocity in the bottom catalyst bed. Simulations were performed using the CFD model to investigate a conventional outlet collector design with an open top, a collector design with a partially blocked top, and a collector design with a fully blocked top. The simulations were performed for a reactor with an elliptical bottom head, as an elliptical bottom is believed to have a greater tendency to cause uneven flow distribution in comparison with a hemisphere bottom. The outlet collector design included an elliptical top surface. The properties of the vapor for the CFD simulations included a density of 0.5 kg/m³, a viscosity of about $1.5 \times 10^{-5}$ Pa-s, and a molecular weight of about 71 g/mol.

Figure 5:
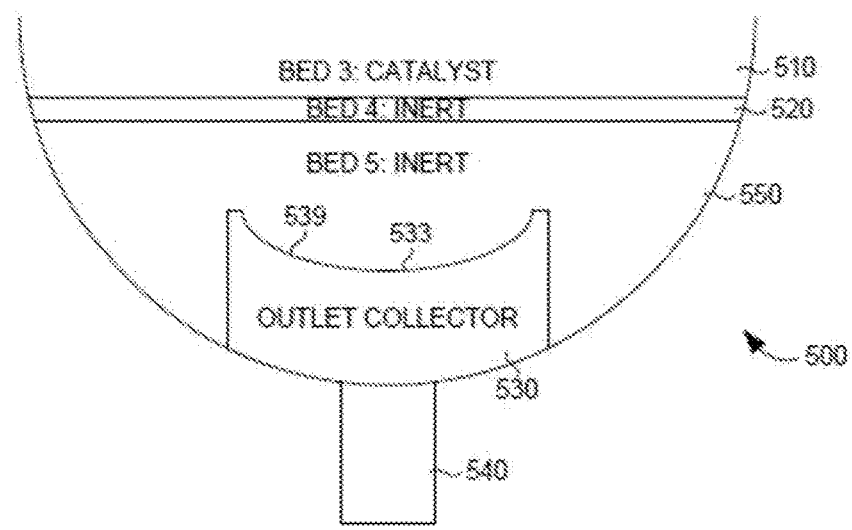
FIG. 5 shows an example of a configuration for the outlet portion of a fixed bed reactor that includes a collector.

FIG. 5 shows a representation of the elliptical reactor bottom configuration that was modeled in the CFD simulations. Reactor 500 can include a final bed of catalyst 510 followed by two additional beds of inert particles 520 and 550. The outlet collector 530 can reside within the bed of inert particles 550. The top surface 533 of outlet collector 530 was either open, full blocked, or partially blocked with the block ending at the radial location indicated at 539. Flow exiting from reactor 500 in the simulations passed through catalyst bed 510 and inert beds 520 and 550 prior to entering collector 530 in order to exit through reactor outlet 540.

Figure 6:
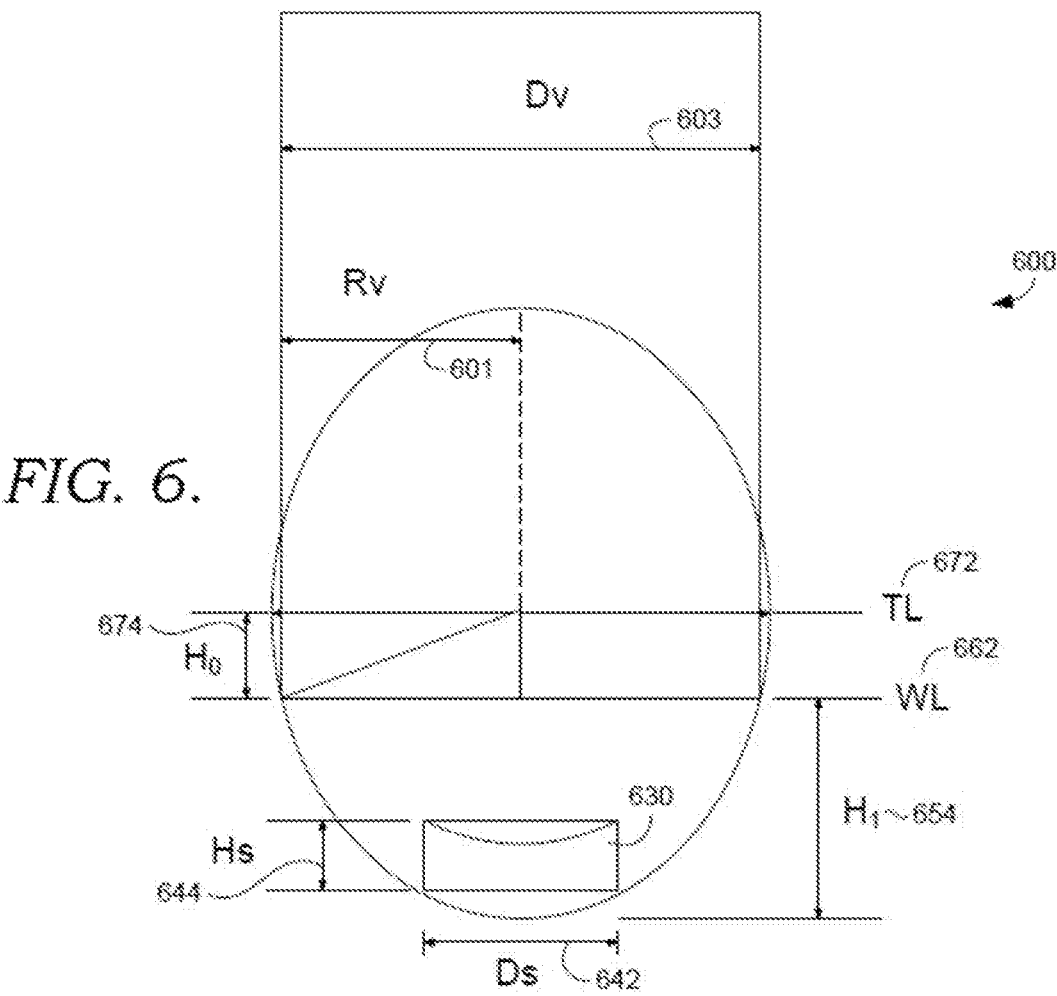
FIG. 6 schematically shows various dimensions associated with the outlet portion of a fixed bed reactor that includes a collector.

FIG. 6 shows various dimensions that can be of relevance for the design of a collector relative to a reactor 600. The dimensions can include the radius 601 and the diameter 603 of the reactor 600; the diameter 642 and height 644 of the collector 630; the height 654 of the bottom head of the reactor (corresponding to the bottom of the reactor to the wedding line 662); and the distance 674 from the start of the bottom head of the reactor (i.e., wedding line 662) to the mid-point of the reactor height (i.e., tangent line 672 of the reactor). In some aspects, a ratio of the diameter 642 of the collector 630 to the diameter 603 of the reactor 600 can be from about 0.2 to about 0.6. In some aspects, a ratio of the height 644 of the collector 630 to the height 654 of the bottom head of the reactor can be about 0.05 to about 0.2.

Figure 7:
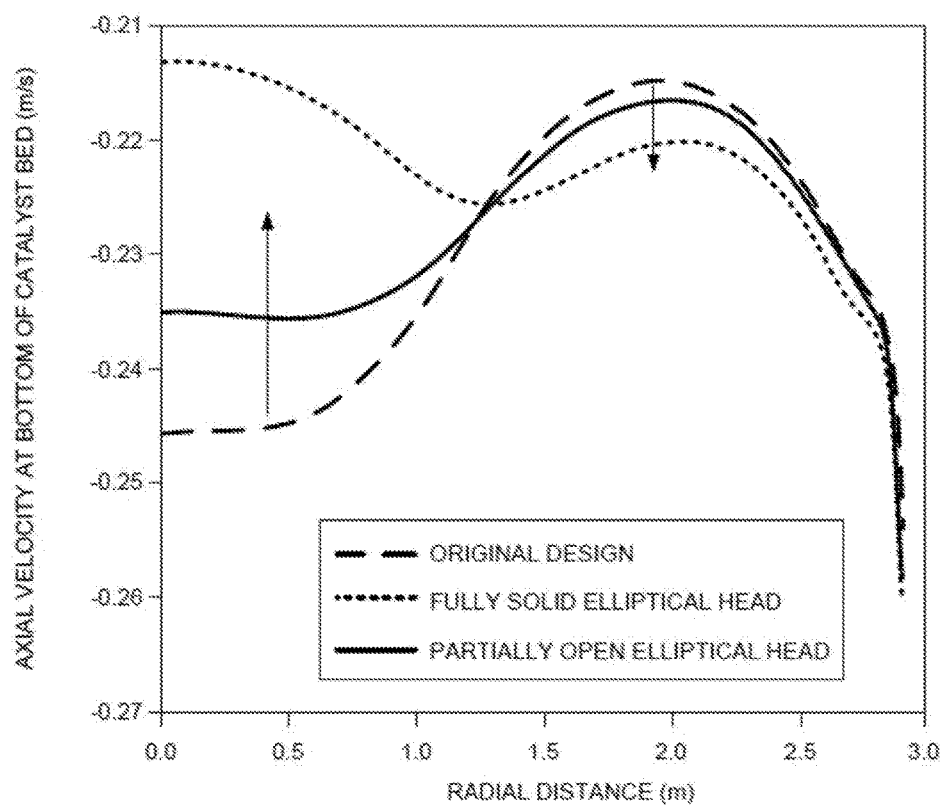
FIG. 7 shows radial velocity profiles at the exit of the bottom catalyst bed for fixed bed reactors with various collector designs.

FIG. 7 shows the impact on velocity within a reactor having a reactor radius of about 3 meters as a function of radius from the reactor center when various collector designs are used. In FIG. 7, a larger negative axial velocity can correspond to a larger magnitude velocity toward the bottom of the reactor. The original design line in FIG. 7, corresponding to a collector with an open top surface, appears to show a large magnitude for the axial velocity at 0 radius (the reactor center), which appears to decrease until edge effects from the reactor wall become more prevalent. Changing to a partially open top surface (with about 60% of the top surface being blocked) can cause the difference between the velocity at zero radius and the minimum velocity at a radius of about 2.0 meters to be reduced. Completely blocking the top surface can modify the velocity profile still further, so that the velocity in the center of the reactor can actually become the minimum velocity. It is noted that the velocity profile can become similar for all three collector designs at radius values approaching the reactor wall.

ADDITIONAL EMBODIMENTS

Embodiment 1

A method for producing distillate fuel boiling range materials, comprising: exposing a distillate fuel boiling range feedstock having a sulfur content of about 15 wppm or less (or about 10 wppm or less) to a dewaxing catalyst comprising a molecular sieve and a metal hydrogenation component under dewaxing conditions to produce a dewaxed effluent comprising a distillate fuel boiling range product and/or blendstock having a cloud point that is reduced relative to a cloud point of the feedstock by at least about 5° C. (or at least 10° C., or at least 15° C., or at least 20° C.), the dewaxing conditions comprising a total pressure of about 200 psig (~1.4 MPa) or less (or about 150 psig (~1.0 MPag) or less), a hydrogen partial pressure of about 100 psig (~700 kPag) or less (about 15 psig (~100 kPag) to about 100 psig (~700 kPag), or about 15 psig (~100 kPag) to about 50 psig (~350 kPag)), and a treat gas rate of 100 SCF/bbl (~17 Nm$^3$/m$^3$) to 5000 SCF/bbl (~850 Nm$^3$/m$^3$) of a treat gas comprising about 5 vol % to about 50 vol % H$_2$ (or about 10 vol % to about 40 vol %), the treat gas optionally having a sulfur content of about 0.001 vol % or less.

Embodiment 2

The method of Embodiment 1, wherein the vol % of H$_2$ in the treat gas is lower than a vol % of H$_2$ in a gaseous portion of the dewaxed effluent.

Embodiment 3

The method of any of the above embodiments, wherein the dewaxing conditions further comprise a temperature of from about 500° F. (~260° C.) to about 750° F. (~399° C.) and a space velocity of from about 0.3 hr$^{-1}$ to about 5.0 hr$^{-1}$.

Embodiment 4

The method of any of the above embodiments, further comprising exposing a second feedstock to a hydrotreating catalyst to form a hydrotreated effluent, and separating the hydrotreated effluent to form the distillate fuel boiling range feedstock, the effective hydrotreating conditions (optionally) comprising a pressure of from about 200 psig (~1.4 MPag) to about 3000 psig (~21 MPag), a temperature of from about 500° F. (~260° C.) to about 800° F. (~427° C.), a hydrogen treat gas rate of about 500 SCF/bbl (~85 Nm$^3$/m$^3$) to about 10000 SCF/bbl (~1700 Nm$^3$/m$^3$) and a space velocity of from about 0.3 hr$^{-1}$ to about 5.0 hr$^{-1}$.

Embodiment 5

The method of any of the above embodiments, wherein the metal hydrogenation component comprises Pt, Pd, or a combination thereof.

Embodiment 6

The method of any of the above embodiments, wherein the dewaxing catalyst comprises about 0.1 wt % to about 5.0 wt % of the metal hydrogenation component.

Embodiment 7

The method of any of the above embodiments, wherein the molecular sieve comprises ZSM-48, ZSM-23, or a combination thereof, the ZSM-48 optionally having a silica to alumina molar ratio of about 60 to 1 to about 110 to 1, e.g., about 60 to 1 to about 90 to 1.

Embodiment 8

The method of any of the above embodiments, wherein the distillate fuel boiling range feedstock has a T5 boiling point of at least about 300° F. (~149° C.) and a T95 boiling point of about 800° F. (~427° C.) or less.

Embodiment 9

The method of any of the above embodiments, further comprising exposing the distillate fuel boiling range product and/or blendstock to a hydrofinishing catalyst under effective hydrofinishing conditions.

Embodiment 10

The method of any of the above embodiments, wherein the dewaxed effluent exits the reactor via a collector having a top surface, the top surface at least partially blocking fluid communication between a bottom of a final catalyst bed and a reactor exit, wherein optionally the top surface substantially completely blocks fluid communication between the bottom of the final catalyst bed and the reactor exit.

Embodiment 11

A system for producing distillate fuel boiling range materials, comprising: a hydrotreating reactor having a hydrotreating inlet in direct fluid communication with a first flow path of a first heat exchanger and a hydrotreating outlet, a feed being provided to the hydrotreating inlet via the first flow path of the first heat exchanger; a dewaxing reactor having a dewaxing inlet and a dewaxing outlet, the dewaxing inlet being in direct fluid communication with a second heat exchanger and in indirect fluid communication with the hydrotreating outlet via the second heat exchanger; a feed heater having a heater inlet in direct fluid communication with the dewaxing outlet and a heater outlet in direct fluid communication with a second flow path of the second heat exchanger, the heater outlet being in indirect fluid communication with a second flow path of the first heat exchanger via the second flow path of the second heat exchanger; and a separation stage in fluid communication with the second flow path of the second heat exchanger.

Embodiment 12

The system of Embodiment 11, wherein the separation stage comprises a flash separator and a third heat exchanger, a first flow path of the third heat exchanger being in direct fluid communication with an overhead output of the flash separator, the overhead output of the flash separator being in indirect fluid communication with a hydrogen recycle compressor via the first flow path of the third heat exchanger, at least a portion of an output of the hydrogen recycle compressor being recycled for combination with the feed via a second flow path of the third heat exchanger.

Embodiment 13

A system for producing distillate fuel boiling range materials, comprising: a hydrotreating reactor having a hydrotreating inlet and a hydrotreating outlet, the hydrotreating inlet being in direct fluid communication with an inlet of a feed heater, the hydrotreating outlet being in direct fluid communication with a first flow path of a first heat exchanger; a first separation stage comprising a stripper having a stripper inlet and a first stripper outlet, the stripper inlet being in fluid communication with the first flow path of the first heat exchanger, the first stripper outlet being in direct fluid communication with a second flow path of the first heat exchanger; a dewaxing reactor having a dewaxing inlet and a dewaxing outlet, the dewaxing inlet being in direct fluid communication with the second flow path of the first heat exchanger; and a second separation stage in fluid communication with the dewaxing outlet, wherein the first stripper outlet is in indirect fluid communication with the dewaxing inlet without passing through an intervening feed heater.

Embodiment 14

The system of Embodiment 13, wherein the stripper inlet is in indirect fluid communication with the first flow path of the first heat exchanger via a first flow path of the second heat exchanger, the inlet of the feed heater being in fluid communication with a second flow path of the second heat exchanger.

Embodiment 15

The system of Embodiment 13 or 14, wherein the stripper further comprises a stripper overhead outlet, the stripper overhead outlet being indirect fluid communication with the first stripper outlet upstream from the first heat exchanger via a second flow path of a third heat exchanger, the second separation stage being in indirect fluid communication with the dewaxing outlet via a first flow path of the third heat exchanger; or wherein the second separation stage is in indirect fluid communication with the dewaxing outlet via a first flow path of a fourth heat exchanger, the inlet of the feed heater being in fluid communication with a second flow path of the fourth heat exchanger; or a combination thereof.

Embodiment 16

A method for producing distillate fuel boiling range materials, comprising: exchanging heat between a distillate boiling range feedstock having an organic sulfur content of at least about 250 wppm and a cooled dewaxed effluent to form a heat-exchanged distillate boiling range feedstock and a dewaxed product stream, the cooled dewaxed effluent having a higher temperature than the distillate boiling range feedstock; exposing the heat-exchanged distillate boiling range feedstock to a hydrotreating catalyst under hydrotreating conditions to produce a hydrotreated effluent comprising a first $H_2S$ content; exchanging heat between the hydrotreated effluent and a heated dewaxed effluent to form a heat-exchanged hydrotreated effluent and the cooled dewaxed effluent, the heated dewaxed effluent having a higher temperature than the hydrotreated effluent, the heat-exchanged hydrotreated effluent having a higher temperature than the heat-exchanged distillate boiling range feedstock; exposing the heat-exchanged hydrotreated effluent to a dewaxing catalyst under dewaxing conditions to produce a dewaxed effluent having a cloud point that is reduced relative to a cloud point of the feedstock by at least about 5° C., the heat-exchanged hydrotreated effluent having an $H_2S$ content that is at least about 50% of the first $H_2S$ content; heating the dewaxed effluent to form the heated dewaxed effluent; and separating the dewaxed product stream to form at least a distillate fuel boiling range product and/or blendstock having a cloud point of less than about 0° C.

Embodiment 17

The method of Embodiment 16, further comprising hydrofinishing (at least a portion of) the dewaxed effluent under hydrofinishing conditions prior to heating the dewaxed effluent.

Embodiment 18

The method of Embodiment 16 or 17, wherein separating the dewaxed product stream further comprises forming an overhead fraction comprising hydrogen, the method further comprising combining at least a portion of the hydrogen in the overhead fraction with the feed, the at least a portion of the hydrogen being heat-exchanged with the overhead fraction.

Embodiment 19

A method for producing distillate fuel boiling range materials, comprising: exchanging heat between a distillate boiling range feedstock having an organic sulfur content of at least about 250 wppm and a dewaxed effluent to form a heat-exchanged distillate boiling range feedstock and a dewaxed product stream, the dewaxed effluent having a higher temperature than the distillate boiling range feedstock; exchanging heat between the heat-exchanged distillate boiling range feedstock and a cooled hydrotreated effluent to form a hydrotreated intermediate stream and a hydrotreatment input stream, the cooled hydrotreated effluent having a higher temperature than the heat-exchanged distillate boiling range feedstock; heating the hydrotreatment input stream to form a heated hydrotreatment input stream; exposing the heated hydrotreatment input stream to a hydrotreating catalyst under hydrotreating conditions to produce a hydrotreated effluent comprising a first $H_2S$ content; exchanging heat between the hydrotreated effluent and a stripper bottoms fraction to form the cooled hydrotreated effluent and a heat-exchanged stripper bottoms fraction, the hydrotreated effluent having a higher temperature than the stripper bottoms fraction; separating the hydrotreated intermediate stream under first stripping conditions to form at least the stripper bottoms fraction and an overhead fraction; exposing the heat-exchanged stripper bottoms fraction to a dewaxing catalyst under dewaxing conditions to produce a dewaxed effluent having a cloud point that is reduced relative to a cloud point of the feedstock by at least about 5° C., the heat-exchanged stripper bottoms having an $H_2S$ content that is about 25% or less of the first $H_2S$ content; and separating the dewaxed product stream to form at least a distillate fuel boiling range product and/or blendstock having a cloud point of less than about 0° C.

EXAMPLES

Example 1

Low Pressure Dewaxing

An empirical model based on prior commercial and laboratory scale composition and reaction data was used to simulate dewaxing of a distillate boiling range feed under various conditions. Properties for the feed in the simulations are shown in Table 2.

TABLE 2

Feed for Low Pressure Dewaxing

| | |
|---|---|
| API Gravity | 33.5 |
| Total Sulfur (wppm) | 6 |
| Total Nitrogen (wppm) | 1 |
| Total Aromatics (wt %) | 18 |
| D86 Initial boiling point (° F.) | 428 |
| D86 T5 | 501 |
| D86 T10 | 582 |
| D86 T50 | 624 |
| D86 T90 | 663 |
| D86 T95 | 667 |
| D86 Final boiling point (° F.) | 671 |

As shown in Table 2, the feed corresponded to a sweet feed, with less than about 10 wppm of sulfur and less than about 5 wppm of nitrogen. The boiling range of the feed was within the distillate boiling range. Processing of the feed was simulated under three types of dewaxing conditions in the presence of a dewaxing catalyst. A first or reference set of conditions corresponded to high pressure dewaxing conditions. The second and third sets of conditions corresponded to performing dewaxing using two different types of low purity hydrogen at low pressure. The reaction conditions were selected to produce a cloud point improvement of 30° C. relative to the feed. Table 3 shows the modeled reaction conditions. The treat gas rate in Table 3 was simulated to correspond to a treat gas rate in once-through operation. The hydrogen treat gas rate for the conditions in Table 3 was simulated to correspond to the treat gas rate multiplied by the hydrogen purity or vol % of $H_2$ in the treat gas. In the model, the reactors were operated under approximately isothermal conditions.

TABLE 3

Low Pressure Dewaxing Modeled Conditions

| | Case 1 (reference) | Case 2 | Case 3 |
|---|---|---|---|
| $H_2$ partial pressure (psi) | ~1200 | ~58 | ~30 |
| Treat gas rate (scf/bbl) | ~2000 | ~2000 | ~2000 |

TABLE 3-continued

Low Pressure Dewaxing Modeled Conditions

| | Case 1 (reference) | Case 2 | Case 3 |
|---|---|---|---|
| Vol % $H_2$ in treat gas | ~100 | ~50.4 | ~26.3 |
| Total pressure (psig) | ~1200 | ~100 | ~100 |
| Temperature (° F.) | ~630 | ~658 | ~670 |

As shown in Table 3, each of the treat gases used was suitable for achieving the desired reduction in cloud point under sweet dewaxing conditions. It is noted that both Case 2 and Case 3 correspond to conditions with low total pressure (100 psig or less), low $H_2$ partial pressure (75 psig or less, or 50 psig or less), and low hydrogen content or purity in the treat gas (about 50 vol % or less). The treat gas in Case 2 was selected to be representative of a kerosene hydrotreater purge gas. In addition to 50.4 vol % of hydrogen, the treat gas in Case 2 also included 35.7 vol % methane; 9.3 vol % ethane; 3.3 vol % propane; and 1.3 vol % of butanes and pentanes. The treat gas in Case 3 was selected to be representative of a mixture of kerosene hydrotreater purge gas and dethanizer off-gas. In addition to 26.3 vol % of hydrogen, the treat gas in Case 3 also included 30.8 vol % methane; 32.6 vol % ethane; 7.2 vol % propane; and 3.0 vol % of butanes and pentanes. The treat gases for all modeled cases did not include $H_2S$ or $NH_3$, as would be expected for sweet service processing.

In addition to being suitable for use in sweet service dewaxing, the low pressure, low hydrogen purity conditions in Cases 2 and 3 also unexpectedly resulted in generation of additional hydrogen under the modeled reaction conditions. Table 4 shows the products generated for each of the modeled cases.

TABLE 4

Low Pressure Dewaxing Products

| | Case 1 (Reference) | Case 2 | Case 3 |
|---|---|---|---|
| $H_2$ partial pressure (psi) | ~1200 | ~58 | ~30 |
| Chemical $H_2$ consumption (wt %) | ~-0.41 | ~0.54 | ~0.48 |
| $C_1$ - $C_4$ (wt %) | ~0.8 | ~0.7 | ~0.7 |
| $C_5$ - 350° F. naphtha (wt %) | ~4.0 | ~3.3 | ~3.4 |
| 350° F.+ diesel (wt %) | ~95.6 | ~95.6 | ~95.5 |

As shown in Table 4, the product yields from each case were comparable, with the exception of the unexpected production of hydrogen in Cases 2 and 3, as compared to the consumption of hydrogen in the reference high pressure dewaxing case. This difference can also be understood relative to the differences in the product characteristics for the diesel boiling range product (350° F.+) from each simulation, as shown in Table 5.

TABLE 5

Low Pressure Dewaxing Product Properties

| | Case 1 | Case 2 | Case 3 |
|---|---|---|---|
| $H_2$ partial pressure (psi) | ~1200 | ~58 | ~30 |
| API Gravity | ~34.3 | ~31.4 | ~31.5 |
| Total Sulfur (wppm) | ~3 | ~5 | ~5 |
| Total Nitrogen (wppm) | ~0.4 | ~1 | ~1 |
| Total Aromatics (wt %) | ~7.5 | ~27.9 | ~25.9 |
| Cetane Index (D4737) | ~64 | ~58 | ~58 |
| D86 Initial boiling point (° F.) | ~448 | ~449 | ~449 |

TABLE 5-continued

Low Pressure Dewaxing Product Properties

|  | Case 1 | Case 2 | Case 3 |
|---|---|---|---|
| D86 T5 | ~502 | ~507 | ~506 |
| D86 T10 | ~561 | ~571 | ~570 |
| D86 T50 | ~623 | ~631 | ~630 |
| D86 T90 | ~665 | ~672 | ~672 |
| D86 T95 | ~671 | ~719 | ~719 |
| D86 Final boiling point (° F.) | ~671 | ~761 | ~761 |

As shown in Table 5, the modeled processes corresponding to low pressure, low hydrogen purity conditions resulted in a diesel boiling range product having a substantial increase in aromatics content. Although the cetane index is lower, the cetane is still suitable for any typical diesel or winter diesel use.

Example 2

Heat Integration for Distillate Hydrotreatment and Sweet Dewaxing

The empirical model based on prior commercial and laboratory scale composition and reaction data was also used to simulate distillate hydrotreating and (sweet) dewaxing using configurations corresponding to FIGS. 1 and 2. The simulation conditions were selected to produce a winter diesel product having a cloud point of about −30° C., corresponding to a reduction in cloud point for the feed of about 35° C.

The conditions for the model were selected so that the reactor inlet temperature for the hydrotreater and the other hydrotreating reaction conditions were the same. As a result, the same hydrotreated feed was generated in the model from hydrotreatment in both the FIG. 1 and FIG. 2 configuration. Based on the heat exchangers, the same inlet temperature was also achieved for the dewaxing reactors in both configurations, even though the configuration in FIG. 2 achieved the dewaxing inlet temperature using heat exchange, as opposed to using a second heater specifically for the dewaxing reactor. Because the FIG. 2 configuration used only one heater, the pressure drop within the configuration was lower, so that the dewaxing reactor in the FIG. 2 configuration had a slightly higher inlet pressure (65 barg for FIG. 1 configuration versus 70 barg for FIG. 2). The other dewaxing reaction conditions were also substantially the same for both dewaxing reactors. As a result, modifying the reaction configuration to use only one heater instead of two resulted in production of substantially the same dewaxed (winter) diesel product at substantially the same yield under substantially similar processing conditions. However, by changing the types of heat exchange performed between flows in the configuration, the configuration in FIG. 2 was able to produce the substantially similar winter diesel product using only one heater in the configuration. It is noted that the simulations showed that the difference between hydrotreatment reactor effluent temperature and the dewaxing reactor inlet temperature was about 30° C., which is sufficient to allow for use of heat exchangers for setting the temperature at the dewaxing reactor inlet.

Example 3

Heat Integration for Distillate Hydrotreatment and Sour Dewaxing

The empirical model based on prior commercial and laboratory scale composition and reaction data was also used to simulate distillate hydrotreating and (sour) dewaxing using configurations corresponding to FIGS. 3 and 4. The simulation conditions were selected to produce a winter diesel product having a sulfur content of less than about 10 wppm and a cloud point of about −35° C. or less, corresponding to a cloud point reduction of about 30° C. relative to the feed. The processing conditions were selected so that the dewaxing conditions were substantially similar between the two configurations. However, maintaining similar dewaxing conditions resulted in different hydrotreating conditions for the configurations. Table 6 shows the feed used for the simulations of the configurations in FIGS. 3 and 4.

TABLE 6

Feed for Sour Dewaxing Comparison

| API Gravity | ~35.2 |
|---|---|
| Specific Gravity @60° F. (g/cm³) | ~0.85 |
| Total Sulfur (wppm) | ~4700 |
| Total Nitrogen (wppm) | ~90 |
| Total Aromatics (wt %) | ~29.8 |
| Cetane Index (D4737) | ~49 |
| D86 Initial boiling point (° C.) | ~178 |
| D86 T5 | ~204 |
| D86 T10 | ~233 |
| D86 T50 | ~268 |
| D86 T90 | ~324 |
| D86 T95 | ~338 |
| D86 Final boiling point (° C.) | ~350 |

The hydrotreatment reactor was modeled as containing a commercially available NiMo hydrotreatment catalyst. The hydrotreatment reactor was modeled at 1.35 hr$^{-1}$ LHSV and 80 barg of inlet pressure. The weighted average bed temperature for the configuration in FIG. 3 was 337° C., while the weighted average bed temperature for the configuration in FIG. 4 was 319° C. For the configuration in FIG. 3, the heater was used to heat the feed entering the hydrotreatment reactor. As a result, sufficient heat has to be added to the feed to provide the desired dewaxing temperature. Because the dewaxing unit is being operated under sour conditions, this results in a higher temperature for hydrotreating than is necessary for achieving desired sulfur removal. For FIG. 4, using the heater to heat the dewaxed effluent, and then performing heat exchange with the input streams for both hydrotreating and dewaxing, can allow a cooler hydrotreating temperature to be used. As noted above, the dewaxing reactors were operated under substantially similar conditions, including a weighted average bed temperature for dewaxing of about 365° C.

Based on the different hydrotreating conditions, the resulting products from the configurations in FIGS. 3 and 4 were different. Table 7 shows product yields from the modeling of the two configurations, while Table 8 shows characteristics of the resulting diesel boiling range product. As shown in Table 7, the configuration in FIG. 4 provides a small yield benefit for diesel boiling range compounds, due to slightly lower conversion of feed at the lower hydrotreatment temperature.

TABLE 7

Sour Dewaxing Product Yields

|  | Case A (FIG. 3) | Case B (FIG. 4) |
|---|---|---|
| Chemical H$_2$ consumption (Sm³/m³) | ~119 | ~108 |
| Chemical H$_2$ consumption (wt %) | ~−1.2 | ~−1.1 |

TABLE 7-continued

Sour Dewaxing Product Yields

| | Case A (FIG. 3) | Case B (FIG. 4) |
|---|---|---|
| $H_2S$ (wt %) | ~0.50 | ~0.50 |
| $NH_3$ (wt %) | ~0.01 | ~0.01 |
| $C_1$ - $C_4$ (wt %) | ~1.7 | ~1.7 |
| $C_5$ - 350° F. naphtha (wt %) | ~4.6 | ~4.5 |
| 350° F. + diesel (wt %) | ~94.3 | ~94.5 |

The lower conversion for the configuration shown in FIG. 4 can also be observed in the boiling point distribution of the diesel boiling range product in Table 8. Table 8 also shows that the configuration in FIG. 4 appears to produce less aromatic saturation than the configuration in FIG. 3. Additionally, the sulfur content of the diesel boiling range product from the configuration in FIG. 4 is close to 10 wppm, indicating that the excess reaction severity was not used. By contrast, the sulfur content of the diesel boiling range product from FIG. 3 was less than about 1 wppm. The excess reaction severity due to increased hydrotreatment temperature for the configuration in FIG. 3 can lead to increased hydrogen consumption as well as reduced catalyst lifetime.

TABLE 8

Diesel Boiling Range Product from Sour Dewaxing

| | Case A (FIG. 3) | Case B (FIG. 4) |
|---|---|---|
| Cloud Point (° C.) | ~−34 | ~−34 |
| API Gravity | ~39.0 | ~38.6 |
| Specific Gravity @60° F. (g/cm$^3$) | ~0.83 | ~0.83 |
| Total Sulfur (wppm) | ~0.3 | ~9.7 |
| Total Aromatics (wt %) | ~9.3 | ~11.9 |
| Cetane Index (D4737) | ~54.5 | ~53.8 |
| Kinematic Viscosity at 40° C. (cSt) | ~3.28 | ~3.29 |
| D86 Initial boiling point (° C.) | ~169 | ~169 |
| D86 T5 | ~196 | ~196 |
| D86 T10 | ~226 | ~226 |
| D86 T50 | ~261 | ~261 |
| D86 T90 | ~314 | ~318 |
| D86 T95 | ~331 | ~333 |
| D86 Final boiling point (° C.) | ~346 | ~347 |

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for producing distillate fuel boiling range material, comprising:

exposing a distillate fuel boiling range feedstock having a sulfur content of about 15 wppm or less to a dewaxing catalyst comprising a molecular sieve and a metal hydrogenation component under dewaxing conditions to produce a dewaxed effluent comprising a distillate fuel boiling range product and/or blendstock having a cloud point that is reduced relative to a cloud point of the feedstock by at least about 5° C. the dewaxing conditions comprising a total pressure of about 200 psig (about 1.4 MPag) or less, a hydrogen partial pressure of about 100 psig (about 700 kPag) or less, and a treat gas rate of about 100 SCF/bbl (about 17 Nm$^3$/m$^3$) to about 5000 SCF/bbl (about 850 Nm$^3$/m$^3$) of a treat gas comprising about 5 vol % to about 50 vol % $H_2$;

wherein the dewaxed effluent exits the reactor via a collector having a top surface, the top surface at least partially blocking fluid communication between a bottom of a final catalyst bed and a reactor exit.

2. The method of claim 1, wherein the top surface substantially completely blocks fluid communication between the bottom of the final catalyst bed and the reactor exit.

3. A system for producing distillate fuel boiling range materials, comprising:

a hydrotreating reactor having a hydrotreating inlet in direct fluid communication with a first flow path of a first heat exchanger and a hydrotreating outlet, a feed being provided to the hydrotreating inlet via the first flow path of the first heat exchanger;

a dewaxing reactor having a dewaxing inlet and a dewaxing outlet, the dewaxing inlet being in direct fluid communication with a second heat exchanger and in indirect fluid communication with the hydrotreating outlet via the second heat exchanger;

a feed heater having a heater inlet in direct fluid communication with the dewaxing outlet and a heater outlet in direct fluid communication with a second flow path of the second heat exchanger, the heater outlet being in indirect fluid communication with a second flow path of the first heat exchanger via the second flow path of the second heat exchanger; and a separation stage in fluid communication with the second flow path of the second heat exchanger.

4. The system of claim 3, wherein the separation stage comprises a flash separator and a third heat exchanger, a first flow path of the third heat exchanger being in direct fluid communication with an overhead output of the flash separator; the overhead output of the flash separator being in indirect fluid communication with a hydrogen recycle compressor via the first flow path of the third heat exchanger, at least a portion of an output of the hydrogen recycle compressor being recycled for combination with the feed via a second flow path of the third heat exchanger.

5. A system for producing distillate fuel boiling range materials, comprising:

a hydrotreating reactor having a hydrotreating inlet and a hydrotreating outlet, the hydrotreating inlet being in direct fluid communication with an inlet of a feed heater, the hydrotreating outlet being in direct fluid communication with a first flow path of a first heat exchanger;

a first separation stage comprising a stripper having a stripper inlet and first stripper outlet, the stripper inlet being in fluid communication with the first flow path of the first heat exchanger; the first stripper outlet being in direct fluid communication with a second flow path of the first heat exchanger;

a dewaxing reactor having a dewaxing inlet and a dewaxing outlet, the dewaxing inlet being in direct fluid communication with the second flow path of the first heat exchanger; and a second separation stage in fluid communication with the dewaxing outlet, wherein the first stripper outlet is in indirect fluid communication with the dewaxing inlet without passing through an intervening feed heater.

6. The system of claim 5, wherein the stripper inlet is in indirect fluid communication with the first flow path of the first heat exchanger via a first flow path of the second heat exchanger, the inlet of the feed heater being in fluid communication with a second flow path of the second heat exchanger.

7. The system of claim 5, wherein the stripper further comprises a stripper overhead outlet, the stripper overhead outlet being indirect fluid communication with the first stripper outlet upstream from the first heat exchanger via a second flow path of a third heat exchanger, the second separation stage being in indirect fluid communication with the dewaxing outlet via a first flow path of the third heat exchanger.

8. The system of claim 5, wherein the second separation stage is in indirect fluid communication with the dewaxing outlet via a first flow path of a fourth heat exchanger, the inlet of the feed heater being in fluid communication with a second flow path of the fourth heat exchanger.

\* \* \* \* \*